(12) United States Patent
Teranishi et al.

(10) Patent No.: US 12,002,152 B2
(45) Date of Patent: Jun. 4, 2024

(54) THREE-DIMENSIONAL MODEL GENERATION METHOD AND THREE-DIMENSIONAL MODEL GENERATION DEVICE

(71) Applicant: Panasonic Intellectual Property Management Co., Ltd., Osaka (JP)

(72) Inventors: Kensho Teranishi, Osaka (JP); Toru Matsunobu, Osaka (JP); Toshiyasu Sugio, Osaka (JP); Satoshi Yoshikawa, Hyogo (JP); Masaki Fukuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 112 days.

(21) Appl. No.: 17/560,584

(22) Filed: Dec. 23, 2021

(65) Prior Publication Data

US 2022/0114785 A1 Apr. 14, 2022

Related U.S. Application Data

(63) Continuation of application No. PCT/JP2020/023606, filed on Jun. 16, 2020.

(30) Foreign Application Priority Data

Jul. 9, 2019 (JP) .................................. 2019-127398

(51) Int. Cl.
*G06T 17/00* (2006.01)
*G06T 19/00* (2011.01)

(52) U.S. Cl.
CPC .............. *G06T 17/00* (2013.01); *G06T 19/00* (2013.01)

(58) Field of Classification Search
None
See application file for complete search history.

(56) References Cited

U.S. PATENT DOCUMENTS

| 7,995,117 | B1 * | 8/2011 | Bonn | H04N 1/32128 |
| | | | | 348/231.3 |
| 8,436,853 | B1 * | 5/2013 | Hickman | G06T 17/00 |
| | | | | 345/419 |
| 10,996,813 | B2 * | 5/2021 | Makarenkova | G06F 3/04845 |
| 2004/0247174 | A1 | 12/2004 | Lyons et al. | |
| 2013/0136341 | A1 | 5/2013 | Yamamoto | |

(Continued)

FOREIGN PATENT DOCUMENTS

JP  2015-56142  3/2015

OTHER PUBLICATIONS

Yoshihiko et al. Machine translated Japanese Patent Document, JP2009122188 (Year: 2009).*

(Continued)

*Primary Examiner* — Saptarshi Mazumder
(74) *Attorney, Agent, or Firm* — WENDEROTH, LIND & PONACK L.L.P.

(57) ABSTRACT

A three-dimensional model generation method includes: generating a first three-dimensional model of a predetermined region from first frames; projecting the first three-dimensional model onto at least one second frame; and generating a second three-dimensional model in accordance with first pixels in the at least one second frame onto which the first three-dimensional model is not projected.

12 Claims, 16 Drawing Sheets

(56) References Cited

U.S. PATENT DOCUMENTS

2015/0077525 A1  3/2015  Fujiwara
2016/0379370 A1  12/2016  Nakazato et al.

OTHER PUBLICATIONS

Extended European Search Report dated Nov. 7, 2022 in corresponding European Patent Application No. 20836622.9.
Xian Xiao et al., "Enhanced 3-D Modeling for Landmark Image Classification", IEEE Transactions on Multimedia, IEEE, USA, vol. 14, No. 4, Aug. 1, 2012, pp. 1246-1258, XP011452913.
International Search Report (ISR) dated Aug. 11, 2020 in International (PCT) Application No. PCT/JP2020/023606.

* cited by examiner

THREE-DIMENSIONAL MODEL GENERATION METHOD AND THREE-DIMENSIONAL MODEL GENERATION DEVICE

This is a continuation application of PCT International Application No. PCT/JP2020/023606 filed on Jun. 16, 2020, designating the United States of America, which is based on and claims priority of Japanese Patent Application No. 2019-127398 filed on Jul. 9, 2019. The entire disclosures of the above-identified applications, including the specifications, drawings and claims are incorporated herein by reference in their entirety.

FIELD

The present disclosure relates to a three-dimensional model generation method and a three-dimensional generation device.

BACKGROUND

Recent years have seen development of a technology for generating a three-dimensional model of a subject, such as a human or a building, by measuring a three-dimensional shape of the subject using multi-view images obtained by capturing images of the subject from multiple viewpoints (see Patent Literature [PTL] 1, for example).

The technology disclosed in PTL 1 first geometrically estimates camera parameters (such as camera position, camera orientation, focal length in pixel unit, and camera lens distortion) for each captured image included in multi-view images. Then, by projecting each of the pixels of the captured image onto a three-dimensional space using the estimated camera parameters, a three-dimensional model of a subject is generated.

CITATION LIST

Patent Literature

PTL 1: Japanese Unexamined Patent Application Publication No. 2015-056142

SUMMARY

Solution to Problem

In accordance with an aspect of the present disclosure, a three-dimensional model generation method includes: generating a first three-dimensional model of a predetermined region from first frames; projecting the first three-dimensional model onto at least one second frame; and generating a second three-dimensional model in accordance with first pixels in the at least one second frame onto which the first three-dimensional model is not projected.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
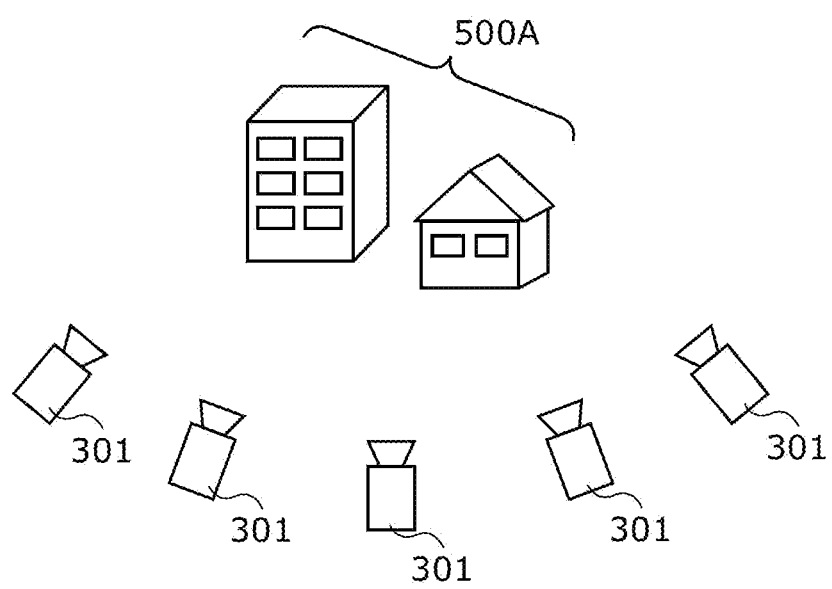
FIG. 1 illustrates an overview of a three-dimensional model generation method according to Embodiment 1.

DESCRIPTION OF EMBODIMENTS (Details Leading up to Present Disclosure)

To reconstruct a three-dimensional shape from sequentially-captured frames (images) using a three-dimensional model generation (reconstruction) technology, a subject overlaps in a plurality of captured frames. Thus, three-dimensional generation processing is performed on the subject multiple times, which increases wasted processing time.

In response to this, the present disclosure provides a three-dimensional model generation method and so forth that are capable of reducing processing time for generating a three-dimensional model.

In accordance with an aspect of the present disclosure, a three-dimensional model generation method includes: generating a first three-dimensional model of a predetermined region from first frames; projecting the first three-dimensional model onto at least one second frame; and generating a second three-dimensional model in accordance with first pixels in the at least one second frame onto which the first three-dimensional model is not projected.

This enables a three-dimensional model to be generated sequentially corresponding to a difference between the generated three-dimensional models. Thus, a model corresponding to an overlapping part common to the three-dimensional models is not generated. This reduces processing time for three-dimensional model generation.

For example, the three-dimensional model generation method further includes generating, in accordance with a position and an orientation of a camera for each of multiple frames captured by the camera, a frameset that includes frames among the multiple frames captured, wherein the frames in the frameset include the first frames and the at least one second frame.

This enables the three-dimensional model to be generated using the frameset including the frames selected from among the multiple frames in accordance with the positions and orientations of the camera. Thus, the frameset that does not include an unnecessary frame in which the predetermined region is not captured is generated, for example. More specifically, a three-dimensional model corresponding to an unnecessary frame is not generated. This reduces the processing time.

For example, the generating of the frameset includes arranging the frames in the frameset in a sequence of the frames, in the projecting, a third three-dimensional model that is an already-generated three-dimensional model including the first three-dimensional model is projected onto the at least one second frame, in the generating of the second three-dimensional model, the first pixels are in the at least one second frame onto which the third three-dimensional model is not projected, and the projecting and the generating of the second three-dimensional model are performed for each of the frames in the sequence.

This enables the projection and the generation of the second three-dimensional model to be executed for each of the frames. By projecting the already-generated three-dimensional model including the first three-dimensional model and the generated second three-dimensional model onto the frame, the first pixels on which the model is not projected can be located. This further reduces the processing time.

For example, in the generating of the frameset, the frames in the frameset are arranged in order of a shorter distance between the predetermined region and the position of the camera for each of the frames in the frameset.

This enables the second three-dimensional model to be generated using the frames arranged in the order of a shorter distance between the predetermined region and the camera that captures the frames. The frame captured by the camera nearer to the subject is an image with higher precision, or more specifically, with higher quality. Hence, the above method reduces the processing time for three-dimensional model generation and also enhances the precision of the three-dimensional model.

For example, in the generating of the frameset, when a direction from the camera toward the predetermined region is defined as a positive direction of a reference axis, the frames in the frameset are arranged in the order of a shorter distance between the predetermined region and the position of the camera for each of the frames in the frameset, the shorter distance being along the positive direction of the reference axis.

This enables the frames to be arranged in the order of a shorter distance between the predetermined region and the camera, in accordance with the reference axis direction.

For example, the generating of the frameset includes calculating the positive direction of the reference axis in accordance with an optical axis direction of the camera at a time of capturing a corresponding one of the frames in the frameset.

This enables the reference axis direction to be calculated in accordance with the optical axis direction of the camera, for example. Thus, an unnecessary frame that hardly includes the predetermined region can be easily excluded from the frameset. This reduces processing time for the unnecessary frame when the three-dimensional model is to be generated.

For example, the generating of the frameset includes: selecting a representative frame from among the frames; and calculating, as the positive direction of the reference axis, an optical axis direction of the camera at a time of capturing the representative frame.

This enables the reference axis direction to be calculated from the optical axis direction of the camera that captures the representative frame, unlike the case where the reference axis direction is calculated from the optical axis directions of the camera that captures the frames. Selecting only an appropriate number of representative frames can reduce processing time for calculation of the reference axis direction.

For example, the generating of the frameset includes: determining whether each of the frames satisfies a first condition; and generating the frameset from a plurality of frames that satisfy the first condition among the frames.

The predetermined first condition that is set appropriately can exclude, from the frameset, an unnecessary frame onto which the first three-dimensional model is entirely projected or which hardly includes the predetermined region. Thus, the above method reduces the processing time for the unnecessary frame when the three-dimensional model is to be generated.

For example, in the generating of the frameset, the determining is performed in accordance with the first condition that an angle between the positive direction of the reference axis and the optical axis direction of the camera at a time of capturing the frame is smaller than or equal to a first angle.

Thus, an unnecessary frame that hardly includes the predetermined region can be easily excluded from the frameset. This reduces the processing time for the unnecessary frame when the three-dimensional model is to be generated.

For example, the predetermined region includes at least one of a stationary subject or a moving subject.

In this case, if the predetermined region includes the subject, a distance between the predetermined region and the camera can be calculated as a distance with respect to the subject. This allows the distance to be calculated accurately.

For example, the at least one second frame is identical to at least one of the first frames.

In this case, if the second frame is determined from among the frames for example, the first frames are not to be excluded. This reduces the processing time.

For example, each of the first frames is different from the at least one second frame.

In this case, when the second three-dimensional model is generated, the second three-dimensional model is not projected onto the first frame. This reduces processing time for generating the second three-dimensional model.

In accordance with another aspect of the present disclosure, a three-dimensional model generation device includes: memory; and a processor coupled to the memory and configured to: generate a first three-dimensional model of a predetermined region from first frames; project the first three-dimensional model onto at least one second frame; and generate a second three-dimensional model in accordance with the first pixels in the at least one second frame onto which the first three-dimensional model is not projected.

The three-dimensional model generation device enables a three-dimensional model to be generated sequentially corresponding to a difference between the generated three-dimensional models. Thus, a model corresponding to an overlapping part common to the three-dimensional models is not generated. Hence, the three-dimensional model generation device reduces processing time for three-dimensional model generation.

In accordance with still another aspect of the present disclosure, a three-dimensional model generation method includes: generating a first three-dimensional model of a predetermined region from first frames; projecting the first three-dimensional model onto projection pixels (second pixels) in at least one second frame; determining whether at least one second position from which the at least one second frame is captured is nearer to the predetermined region than any one of first positions from which the respective first frames are captured; and when the at least one second position is determined to be nearer to the predetermined region than any one of the first positions, updating the first three-dimensional model in accordance with the projection pixels before the first three-dimensional model is projected.

This enables the three-dimensional model to be generated using the frames captured by the camera that are arranged in time sequence. Thus, the frames are processed in a sequence in which the frames are captured, without generating the frameset in which the frames are rearranged. This allows the three-dimensional model to be generated in a short time. Moreover, the pixels in a frame onto which the already-generated three-dimensional model is projected are updated to pixels with higher precision as compared to these pixels in this frame (or more specifically, updated to pixels of a frame that is captured by the camera nearer to the predetermined region). With these updated pixels, the new three-dimensional model is generated. Hence, the three-dimensional model with high precision can be generated.

For example, the three-dimensional model generation method further includes generating a second three-dimensional model in accordance with the first pixels in the at least one second frame onto which the first three-dimensional model is not projected.

This enables the second three-dimensional model to be generated using the first pixels that are not included in the first three-dimensional model.

Hereinafter, certain exemplary embodiments of a three-dimensional model generation method and the like according the present disclosure will be described in detail with reference to the accompanying Drawings. The following embodiments are specific examples of the present disclosure. The numerical values, shapes, materials, elements, arrangement and connection configuration of the elements, steps, the order of the steps, etc., described in the following embodiments are merely examples, and are not intended to limit the present disclosure.

It should also be noted that each figure in the Drawings is a schematic diagram and is not necessarily an exact diagram. In each figure, substantially identical constituent elements are assigned with a same reference sign, and explanation of such substantially identical constituent elements is sometimes not repeated or simplified.

Embodiment 1

[Overview]

First, an overview of a three-dimensional generation method according to Embodiment 1 is described with reference to FIG. 1.

Figure 2:
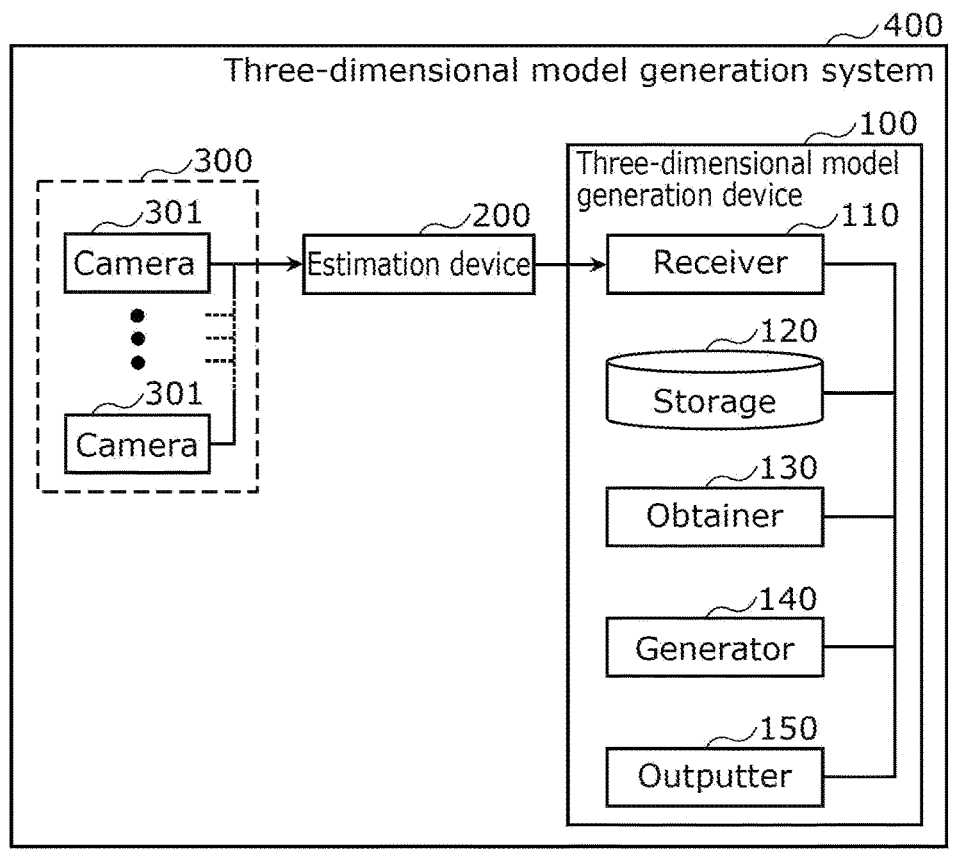
FIG. 2 is a block diagram illustrating a characteristic configuration of a three-dimensional model generation device according to Embodiment 1.

FIG. 1 illustrates the overview of the three-dimensional model generation method according to Embodiment 1. FIG. 2 is a block diagram illustrating a characteristic configuration of three-dimensional model generation device 100 according to Embodiment 1.

Three-dimensional model generation system 400 includes: camera group 300 including a plurality of cameras 301 that are imaging devices for imaging a predetermined region; estimation device 200 that estimates positions and orientations of the plurality of cameras 301 in accordance with a plurality of frames (in other words, image data or video data) captured by the plurality of cameras 301; and three-dimensional model generation device 100 that receives the plurality of frames captured by the plurality of cameras 301 and a result of the estimation made by estimation device 200.

The orientation of camera 301 indicates at least one of an imaging direction of camera 301 or a tilt of camera 301.

The predetermined region includes either one or both of a stationary subject and a moving subject, such as a human. More specifically, the predetermined region includes at least one of a stationary subject and a moving subject, as a subject, for example. Examples of the predetermined region including the stationary subject and the moving subject include a sports game, such as a basketball game, and a town where a human or a car is present. Note that the predetermined region may be not only a scene including a specific target as a subject, but also a scene including a landscape or the like. FIG. 1 illustrates an example where subject 500A is a building. In the following, the predetermined region that includes not only a specific target as a subject but also a landscape or the like is also simply referred to as a subject.

The plurality of cameras 301 image the subject and then output a plurality of captured frames to estimation device 200. In the present embodiment, camera group 300 includes at least two cameras 301. Moreover, the plurality of cameras 301 image the same subject from different viewpoints.

Note that three-dimensional model generation system 400 may include the plurality of cameras 301 or single camera 301. For example, three-dimensional model generation system 400 may cause single camera 301 to move to capture a plurality of frames from different viewpoints (in other words, multi-view video data). Thus, the plurality of frames are captured (generated) by camera 301 that changes in at least one of position or orientation for each frame.

Camera 301 may generate a two-dimensional image, or may include a three-dimensional measurement sensor that generates a three-dimensional model. In the present embodiment, each of the plurality of cameras 301 generates a two-dimensional image.

In order to input the captured frames to estimation device 200, at least one camera 301 is connected by wire or wirelessly to estimation device 200 or a not-shown hub like a communication device or a server.

The frames captured by the at least one camera 301 may be outputted in real time. Alternatively, the frames may be first recorded into an external storage device, such as a memory or a cloud server, and then outputted from such external storage device.

Each of the at least one camera 301 may be a fixed camera like a surveillance camera, or a mobile camera like a video camera, a smartphone, or a wearable camera. Alternatively, each of the at least one camera 301 may be a moving camera like a drone with an imaging function.

Estimation device 200 estimates positions, orientations, and camera parameters of the plurality of cameras 301, in accordance with the plurality of frames obtained from the at least one camera 301.

Here, the camera parameter indicates characteristics of camera 301. The camera parameter includes at least one parameter. The camera parameter includes: internal parameters indicating a focal length and an image center of camera 301; and external parameters indicating a position (or more specifically, a three-dimensional position) and an orientation of camera 301.

An estimation method used by estimation device 200 to estimate the position and orientation of camera 301 is not particularly intended to be limiting. For example, estimation device 200 estimates the positions and orientations of the plurality of cameras 301 according to the visual simultaneous localization and mapping (Visual-SLAM) technique. Alternatively, estimation device 200 estimates the position and orientation for each of the at least one camera 301 according to the structure-from-motion technique, for example.

Moreover, estimation device 200 calculates a distance between camera 301 and the subject as a camera parameter in accordance with the position and orientation of camera 301 estimated using the aforementioned technique, for example. Here, three-dimensional model generation system 400 may include a range sensor. Using this range sensor, the distance between camera 301 and the subject may be measured.

In order to input the plurality of frames received from camera 301 and the result of the estimation to three-dimensional model generation device 100, estimation device 200 is connected by wire or wirelessly to three-dimensional model generation 100 or a not-shown hub like a communication device or a server.

Estimation device 200 inputs the plurality of frames received from camera 301 and the estimated camera parameters to three-dimensional model generation device 100.

The result of the estimation made by estimation device 200 may be outputted in real time. Alternatively, the result of the estimation may be first recorded into an external storage device, such as a memory or a cloud server, and then outputted from such external storage device.

Three-dimensional model generation 100 may store the camera parameters beforehand. In this case, three-dimensional model generation system 400 may not include estimation device 200. Moreover, the plurality of cameras 301 may be communicably connected by wire or wirelessly to three-dimensional model generation device 100.

The plurality of frames captured by camera 301 may be directly inputted to three-dimensional model generation device 100. In this case, camera 301 is connected by wire or wirelessly to three-dimensional model generation 100 or a not-shown hub like a communication device or a server.

For example, estimation device 200 includes at least a computer system that includes: a control program; a processing circuit, such as a processor or a logic circuit, that executes the control program; and a recording device, such as an internal memory or an accessible external memory, that stores the control program.

Three-dimensional model generation device 100 generates a model of the subject in a (virtual) three-dimensional space, in accordance with the positions, orientations, and camera parameters of the plurality of cameras 301 and the plurality of frames. To be more specific, three-dimensional model generation device 100 executes three-dimensional model generation processing.

Here, the plurality of frames refer to multi-view video. The multi-view video is obtained by camera 301 that images, while moving, the subject present in a real space or by the plurality of cameras 301 that image the subject from different viewpoints. Thus, each of the plurality of frames is an image captured from a different viewpoint. More specifically, estimation device 200 estimates the positions, orientations (imaging directions), camera parameters of the plurality of cameras 301, in accordance with the plurality of frames from different viewpoints that are obtained from the at least one camera 301.

Note that the subject generated, or more specifically, the subject reconstructed in shape in the virtual three-dimensional space in accordance with the frames in which the real subject is captured is referred to as a three-dimensional model. The three-dimensional model of the subject is a collection of points which represent three-dimensional positions of a plurality of points on the subject captured in multi-view images, or more specifically, in a plurality of two-dimensional images of the subject captured by camera 301 that is different in at least one of position or orientation for each image.

For example, a three-dimensional position is represented by three-valued information including an X component, a Y component, and a Z component of the three-dimensional space having an X axis, a Y axis, and a Z axis that are perpendicular to each other. Here, the information including a plurality of points to indicate the three-dimensional position may include not only the three-dimensional position (that is, information indicating coordinates), but also information indicating a color for each point and information indicating a surface shape for each point or around this point.

For example, three-dimensional model generation device 100 includes at least a computer system that includes: a control program; a processing circuit, such as a processor or a logic circuit, that executes the control program; and a recording device, such as an internal memory or an accessible external memory, that stores the control program. Here, three-dimensional model generation device 100 may be implemented through hardware implementation by the processing circuit or through execution of a software program by the processing circuit, the software program being stored in a memory or distributed from an external server, for example. Alternatively, three-dimensional model generation device 100 may be implemented by a combination of the hardware implementation and the software implementation described above.

[Configuration of Three-Dimensional Model Generation Device]

Figure 3:
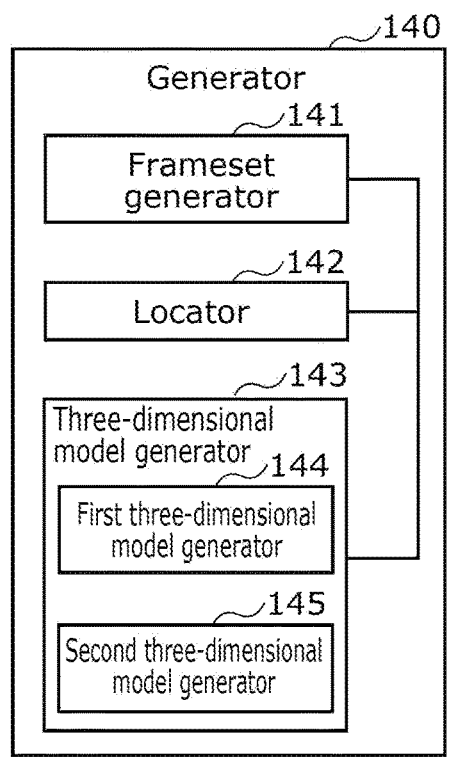
FIG. 3 is a block diagram illustrating a detailed configuration of a generator included in the three-dimensional model generation device according to Embodiment 1.

The following describes a detailed configuration of three-dimensional model generation device 100, with reference to FIG. 2 and FIG. 3.

Three-dimensional model generation device 100 generates a three-dimensional model from a plurality of frames. Three-dimensional model generation device 100 includes receiver 110, storage 120, obtainer 130, generator 140, and outputter 150.

Receiver 110 receives, from estimation device 200, a plurality of images captured by the plurality of cameras 301 and the positions, orientations, and camera parameters of the plurality of cameras 301 estimated by estimation device 200. For example, receiver 110 is a communication interface for communicating with estimation device 200. If three-dimensional model generation device 100 communicates with estimation device 200 wirelessly, receiver 110 includes an antenna and a wireless communication circuit, for example. In contrast, if three-dimensional model generation device 100 communicates with estimation device 200 by wire, receiver 110 includes a connecter that is connected to a communication line, for example.

Receiver 110 outputs, to storage 120, the plurality of received frames captured by the plurality of cameras 301 and the positions, orientations, and camera parameters of the at least one camera 301 estimated by estimation device 200.

Storage 120 is a memory that stores: the plurality of frames captured by the at least one camera 301 and then received by receiver 110; and the positions, orientations, and camera parameters estimated by estimation device 200 and then received by receiver 110. For example, storage 120 stores control programs to be executed by processors included in three-dimensional model generation device 100.

Storage 120 is implemented by a hard disk drive (HDD) or a flash memory, for example.

Obtainer 130 obtains, from storage 120: the plurality of frames captured by the at least one camera 301 and then stored in storage 120; and the positions, orientations, and camera parameters of the at least one camera 301 estimated by estimation device 200 and then stored in storage 120. Then, obtainer 130 outputs these obtained frames, positions, orientations, and camera parameters to generator 140.

Here, receiver 110 may output the plurality of frames received from the at least one camera 301 and the positions, orientations, and camera parameters of the at least one camera 301 estimated by estimation device 200, directly to generator 140.

Generator 140 is a processor that generates a three-dimensional model of the subject, in accordance with: the plurality of images captured by the plurality of cameras 301 and then received from obtainer 130; and the positions, orientations, and camera parameters of the plurality of cameras 301 estimated by estimation device 200 and then received from obtainer 130.

FIG. 3 is a block diagram illustrating a detailed configuration of generator 140 included in three-dimensional model generation device 100 according to Embodiment 1.

Generator 140 includes frameset generator 141, locator (projector) 142, and three-dimensional model generator 143.

Frameset generator 141 is a processor that generates a frameset including a plurality of frames. These frames are selected from among a plurality of frames (captured frames), in accordance with the positions and orientations of camera 301 when capturing the plurality of frames (captured frames). One piece of data indicating a position and an orientation (position-orientation data) of a camera is associated with one frame. Thus, frameset generator 141 generates a frameset including frames selected from among the plurality of frames, in accordance with a plurality of pieces of position-orientation data indicating the positions and orientations of camera 301 when capturing the plurality of frames. A frameset includes a plurality of first frames and a single second frame. A first frame is used by first three-dimensional model generator 144 for generating a first three-dimensional model. A second frame is used for generating a second three-dimensional model.

Here, at least one second frame may be identical to at least one of the plurality of first frames. Alternatively, each of the plurality of first frames may be different from the second frame.

For example, frameset generator 141 generates a multi-view frameset (also simply referred to as a frameset) in which a plurality of frames are rearranged in a predetermined sequence. This arrangement is based on: the plurality of frames captured by the at least one camera 301 and then received from obtainer 130; and the positions, orientations, and camera parameters of the at least one camera 301 estimated by estimation device 200 and then received from obtainer 130.

Locator 142 is a processor that projects a first three-dimensional model onto the at least one second frame and then locates (determines), in the at least one second frame, a plurality of first pixels onto which the first three-dimensional model is not projected. More specifically, locator 142 projects the first three-dimensional model generated by first three-dimensional model generator 144 described later onto the at least one second frame that is different from the first frames but included in the plurality of frames. Then, in the at least one second frame onto which the frame three-dimensional model is projected, locator 142 locates the first pixels onto which the first three-dimensional model is not projected. To be even more specific, locator 142 projects the three-dimensional model that has already been generated (hereafter, also referred to as the already-generated three-dimensional model) onto the frames in the sequence of the frames included in the frameset generated by frameset generator 141. For example, by projecting the already-generated three-dimensional model onto the frame, locator 142 locates the first pixels onto which the three-dimensional model is not projected from among the pixels of the frame onto which the three-dimensional model is projected. In other words, locator 142 locates pixels representing a difference between the already-generated three-dimensional model and the frame.

Three-dimensional model generator 143 is a processor that generates a three-dimensional model from the plurality of frames. For example, three-dimensional model generator 143 first generates a three-dimensional model (a first three-dimensional model). Then, three-dimensional model generator 143 newly generates a three-dimensional model (hereafter, also referred to as a second three-dimensional model or a new three-dimensional model) corresponding to the pixels onto which the three-dimensional model is not projected in the frame onto which locator 142 projects the generated three-dimensional model. Three-dimensional model generator 143 outputs the new three-dimensional model to storage 120, for example. Storage 120 stores the new three-dimensional model received from three-dimensional model generator 143.

Three-dimensional model generator 143 includes first three-dimensional model generator 144 and second three-dimensional model generator 145.

First three-dimensional model generator 144 is a processor that generates a first three-dimensional model of the predetermined region from the plurality of first frames. More specifically, first three-dimensional model generator 144 generates the first three-dimensional model of the subject from the plurality of frames (first frames) included in the plurality of frames.

Second three-dimensional model generator 145 is a processor that generates a second three-dimensional model in accordance with the first pixels located by locator 142.

For example, locator 142 projects the already-generated three-dimensional model onto a frame that is included in the frameset and onto which the three-dimensional model has not been projected. Then, locator 142 locates, in this frame, first pixels onto which the three-dimensional model is not projected. Here, the already-generated three-dimensional model refers to the first three-dimensional model if second three-dimensional model generator 145 does not generate the second three-dimensional model. If second three-dimensional model generator 145 generates the second three-dimensional model, the already-generated three-dimensional model includes the first three-dimensional model and the second three-dimensional model that is generated by second three-dimensional model generator 145. Second three-dimensional model generator 145 further generates the new three-dimensional model corresponding to the first pixels onto which the already-generated three-dimensional model is not projected in the frame onto which locator 142 projects the already-generated three-dimensional model.

By projecting the three-dimensional model onto each of the frames according to the sequence in the frameset, locator 142 and three-dimensional model generator 143 locate, in the frame, the first pixels onto which the three-dimensional model is not projected and then generate the three-dimensional model corresponding to the first pixels located.

For example, a three-dimensional model to be first projected onto a frame is generated from the frameset by three-dimensional model generator 143. For instance, three-dimensional model generator 143 first generates a three-dimensional model using first and second frames of the frameset. Then, by projecting this generated three-dimensional model onto a third frame, three-dimensional model generator 143 locates first pixels onto which the three-dimensional model is not projected, from among the pixels of the third frame.

For example, frameset generator 141 arranges a plurality of frames included in a frameset according to a sequence of the frames. For instance, frameset generator 141 generates a frameset in which the plurality of frames are arranged according to a predetermined condition. In this case, locator 142 projects the already-generated three-dimensional model (the third three-dimensional model) including the first three-dimensional model onto at least one second frame, for example. Then, locator 142 locates first pixels onto which the already-generated three-dimensional model is not projected, in the at least one second frame onto which the already-generated three-dimensional model is projected. Locator 142 and second three-dimensional model generator 145 perform the aforementioned processing for each of the frames arranged in sequence. The already-generated three-dimensional model includes the first three-dimensional model and the second three-dimensional model generated.

Here, the predetermined condition may be freely set beforehand. For example, frameset generator 141 calculates a positive direction of a reference axis, in accordance with optical axis directions of camera 301 when capturing the plurality of frames. More specifically, frameset generator 141 determines a sequence of frames in accordance with the calculated positive direction of the reference axis and then generates a frameset according to the determined sequence of frames.

For example, the optical axis direction is perpendicular to a light incidence plane of a sensor included in camera 301. Alternatively, the optical axis direction is an optical axis direction of a lens included in camera 301. The positive direction of the optical axis refers to a normal direction of the light incidence plane of the sensor included in camera 301, for example. A negative direction of the optical axis refers to a direction in which light enters camera 301, for example.

One piece of data indicating an optical axis direction (optical axis data) of a camera is associated with one frame. Thus, frameset generator 141 generates a frameset including frames selected from among the plurality of frames, in accordance with a plurality of pieces of optical axis data indicating the optical axes of camera 301 when capturing the plurality of frames.

For example, frameset generator 141 selects one frame, as a representative frame, from among the plurality of frames. Then, frameset generator 141 calculates the optical axis direction of camera 301 that captures the selected representative frame, as the positive direction of the reference axis. Here, the number of representative frames may be one or at least two. If the number of representative frames is at least two, frameset generator 141 may calculate, as the reference axis direction, a mean value of the optical axis directions of camera 301 when capturing the at least two selected representative frames.

For example, frameset generator 141 generates a frameset in which the plurality of captured frames are arranged in the order of a shorter distance between the camera and the subject in the reference axis direction. In other words, frameset generator 141 generates the frameset in which the plurality of frames captured by camera 301 are arranged in the order of a shorter distance between the position of camera 301 and the predetermined region. To be more specific, a direction viewed from camera 301 to the predetermined direction, that is, a direction toward the predetermined region from camera 301, is the positive direction of the reference axis. In this case, frameset generator 141 generates the frameset in which the plurality of frames captured by camera 301 are arranged in the order of a shorter distance between the position of camera 301 and the predetermined region in the positive direction of the reference axis.

Here, frameset generator 141 may generate a frameset using all frames included in the plurality of frames stored in storage 120. Alternatively, frameset generator 141 may generate a frameset using some of the plurality of frames stored in storage 120.

For example, frameset generator 141 determines whether each of the plurality of frames satisfies a first condition. Then, frameset generator 141 generates a frameset using the frame that satisfies the first condition, out of the plurality of frames. Here, the predetermined first condition may be freely set beforehand. For example, frameset generator 141 may make the aforementioned determination based on the predetermined first condition that an angle between the positive direction of the reference axis and the optical axis direction of camera 301 when capturing the frame included in the plurality of frames of the frameset is smaller than or equal to a predetermined first angle. More specifically, if the angle between the positive direction of the reference axis and the optical axis direction of camera 301 is smaller than or equal to the predetermined first angle, frameset generator 141 includes the frame captured by this camera 301 into the frameset. In contrast, if the angle between the positive direction of the reference axis and the optical axis direction of camera 301 is greater than the predetermined first angle, frameset generator 141 does not include the frame captured by this camera 301 into the frameset.

Referring back to FIG. 2, outputter 150 is a processor that outputs the three-dimensional model stored in storage 120. For example, outputter 150 generates a single three-dimensional model by integrating the already-generated three-dimensional model and the new three-dimensional model stored in storage 120, and then outputs this single three-dimensional model. For example, outputter 150 includes: a display device that is not shown, such as a display; and an antenna, a wireless communication circuit, and a connector that enable communication by wired or wireless connection. Outputter 150 outputs the integrated three-dimensional model to the display device so that this three-dimensional model is displayed on the display device.

[Procedure Performed by Three-Dimensional Model Generation Device]

The following describes in detail a three-dimensional model generation procedure performed by three-dimensional model generation device 100, with reference to FIG. 4 to FIG. 18

[Overview]

Figure 4:
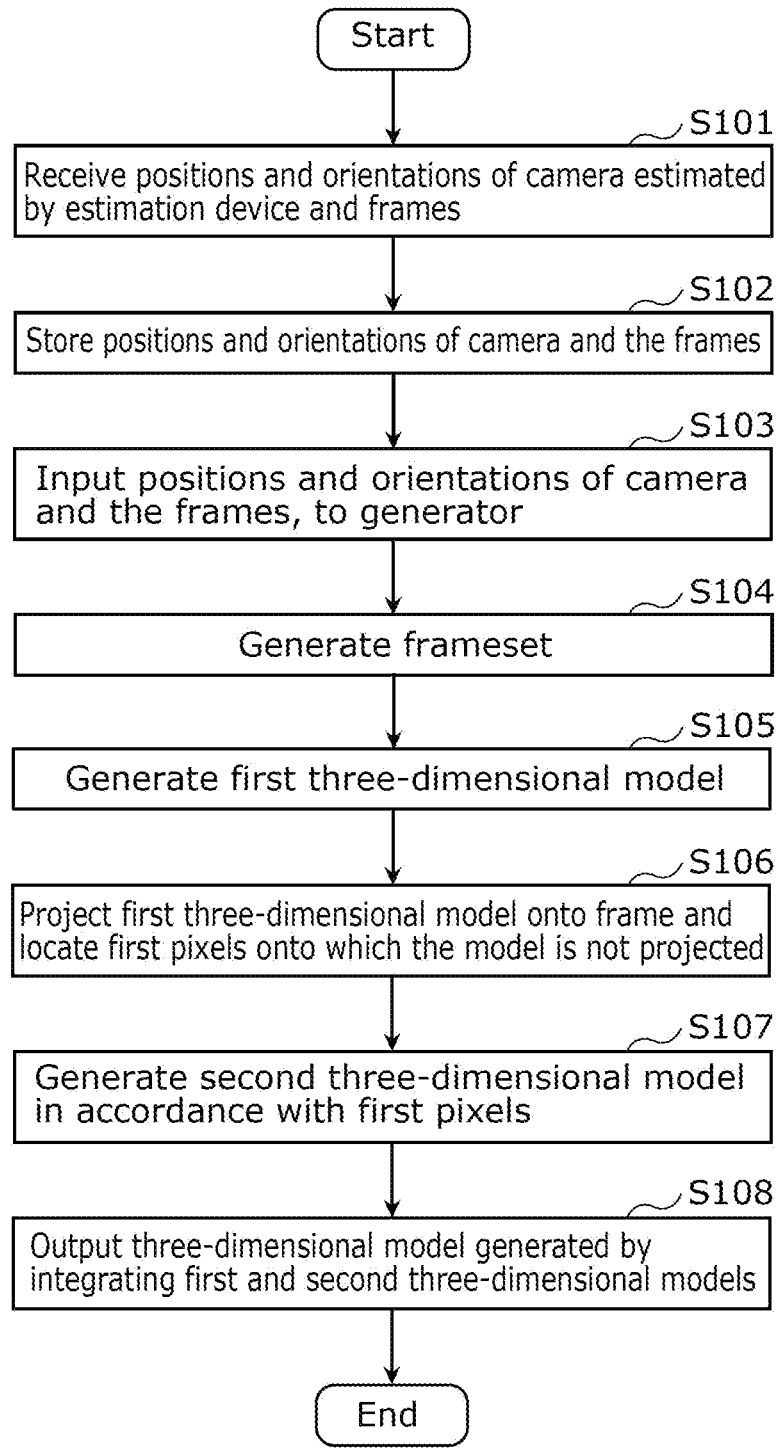
FIG. 4 is a flowchart illustrating processing executed by the three-dimensional model generation device according to Embodiment 1.

FIG. 4 is a flowchart illustrating processing executed by three-dimensional model generation device 100 according to Embodiment 1.

Receiver 110 first receives information indicating the positions and orientations of camera 301 estimated by estimation device 200, camera parameters, and a plurality of frames (captured frames) (Step S101). Then, receiver 110 outputs these received pieces of data to storage 120.

Next, storage 120 stores the information indicating the positions and orientations of cameras 301, the camera parameters, and the plurality of frames (captured frames) that are received by receiver 110 in Step S101 (Step S102).

Next, obtainer 130 inputs, to generator 140, the information indicating the positions and orientations of cameras 301, the camera parameters, and the plurality of frames (captured frames) that are stored in storage 120 (Step S103).

Next, frameset generator 141 generates a frameset including a plurality of frames arranged in a sequence determined in accordance with a plurality of pieces of data indicating the positions and orientations of camera 301 when capturing the plurality of frames (captured frames), the camera parameters, and the plurality of frames (captured frames) (Step S104).

Next, first three-dimensional model generator 144 generates a three-dimensional model (a first three-dimensional model) from the frameset (Step S105). For example, first three-dimensional model generator 144 generates the first three-dimensional model using any two frames (first frames) included in the frameset.

Next, locator 142 projects the first three-dimensional model generated in Step S105 onto a frame (a second frame) (Step S106). More specifically, locator 142 projects the first three-dimensional model onto at least one second frame that is different from the first frames but included in the plurality of frames.

Next, second three-dimensional model generator 145 generates a three-dimensional model (a second three-dimensional model) in accordance with first pixels onto which the first three-dimensional model is not projected in the second frame in Step S106 (Step S107).

Next, outputter 150 integrates the first three-dimensional model and the second three-dimensional model and outputs the integrated three-dimensional model (Step S108).

[Processing of Determining Sequence of Frames]

The following describes frameset generation processing (or more specifically, processing of determining a sequence of frames) performed by frameset generator 141 in Step S104 of FIG. 4, with reference to FIG. 5A to FIG. 8B.

Frameset generator 141 may generate the frameset using all the frames stored in storage 120. Alternatively, frameset generator 141 may select at least three frames from among all the frames and generate the frameset using the selected frames.

The frames of the frameset may be arranged in a moving direction of camera 301 in which the position and orientation of camera 301 moves in a negative direction of the optical axis direction (in other words, the imaging direction) of cameras 301.

Moreover, generator 140 (or more specifically, frameset generator 141) may generate a frameset by thinning out the plurality of frames stored in storage 120.

For example, obtainer 130 obtains the plurality of frames from storage 120 in a random sequence. In this case, frameset generator 141 generates a frameset in which the plurality of frames are arranged in ascending order according to the position and orientation of camera 301 that captures the plurality of frames along the negative direction of the optical axis direction of camera 301. In other words, frameset generator 141 generates the frameset in which the plurality of frames are rearranged in the order of a shorter distance between the subject and the positions of camera 301 when capturing the plurality of frames.

Here, frameset generator 141 may add identification information, such as an index number, that indicates a position in the sequence, individually to each frame of the frameset. Alternatively, frameset generator 141 may add this identification information collectively to the frameset.

Note that frame t, frame t+1, frame t+2, frame t+3, frame t+4, and frame t+5 described below are captured by camera 301 in time sequence in this order. Note also that a target as the subject is present in the optical axis direction of the camera in FIG. 5A to FIG. 8B. Moreover, the optical axis direction of the camera matches the reference axis direction in FIG. 5A to FIG. 8B.

Example 1

Figure 5A:
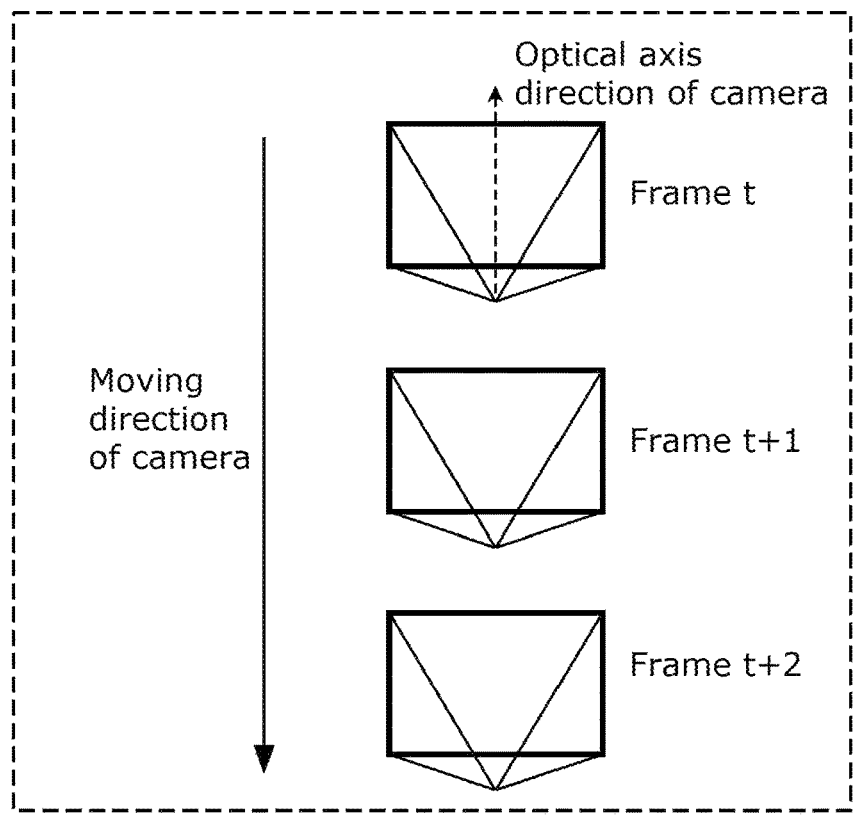
FIG. 5A illustrates a sequence of imaging of a camera according to Example 1.

FIG. 5A illustrates a sequence of imaging of camera 301 according to Example 1.

Figure 5B:
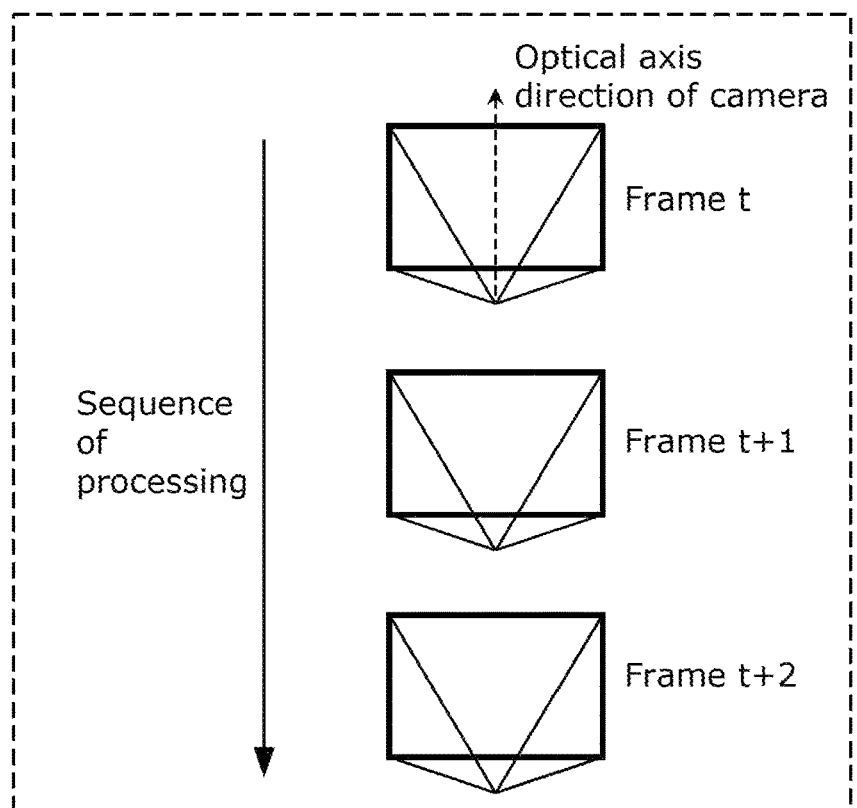
FIG. 5B illustrates a sequence of processing performed by the three-dimensional model generation device corresponding to the sequence of imaging of the camera, according to Example 1.

FIG. 5B illustrates a sequence of frames determined by three-dimensional model generation device 100 corresponding to the sequence of imaging of camera 301, according to Example 1.

In Example 1, camera 301 images a subject while moving away from the subject. In this case, generator 140 (or more specifically, frameset generator 141) generates a frameset in which frames are arranged in a moving direction of camera 301 following the sequence of processing as illustrated in FIG. 5B. To be more specific, generator 140 generates the frameset in which frames are arranged in a sequence in which the subject is imaged.

As described above, the plurality of frames are captured by camera 301 while the position of camera 301 moves away from the subject. In this case, frameset generator 141 is capable of generating the frameset in which the frames captured by camera 301 are arranged in the order of a shorter distance between the position of camera 301 and the subject, by arranging the frames of the frameset in the sequence in which the subject is imaged.

Example 2

Figure 6A:
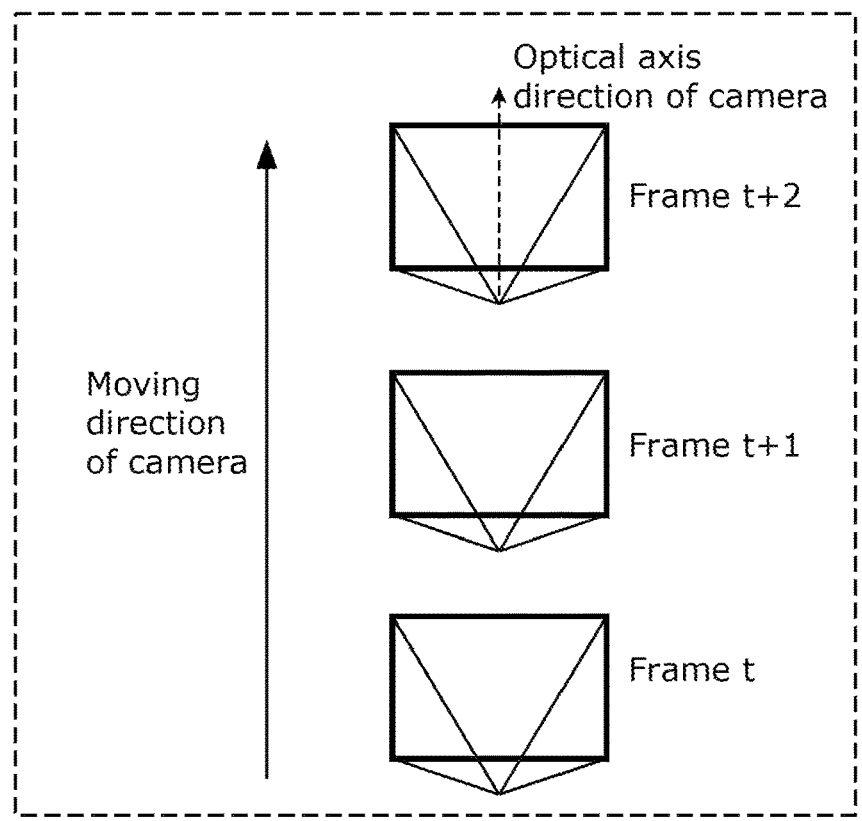
FIG. 6A illustrates a sequence of imaging of a camera according to Example 2.

FIG. 6A illustrates a sequence of imaging of camera 301 according to Example 2.

Figure 6B:
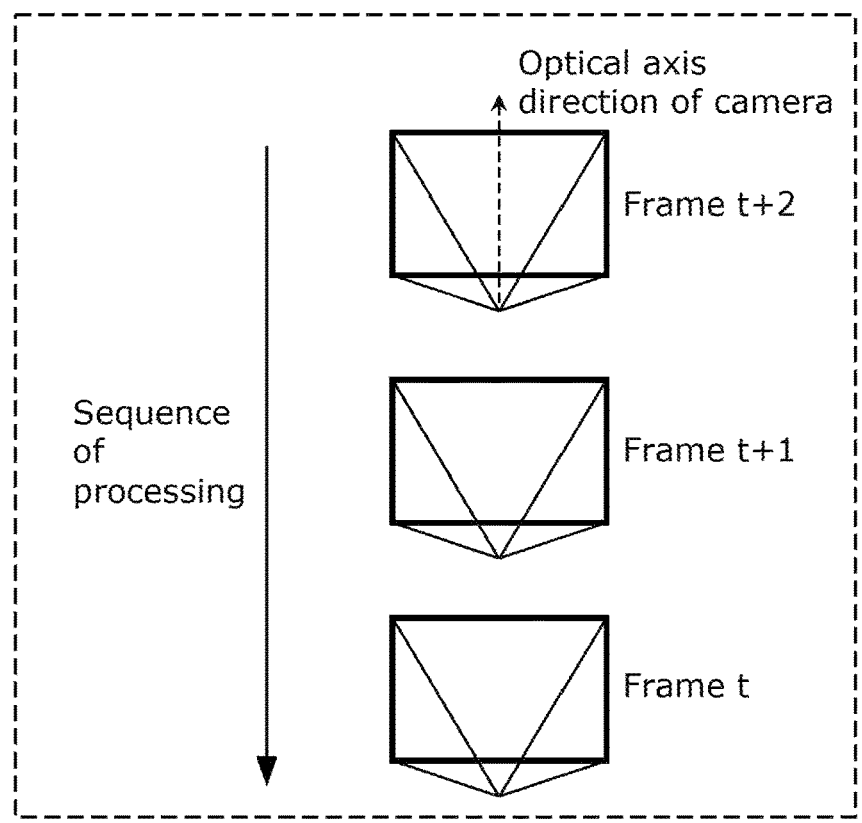
FIG. 6B illustrates a sequence of processing performed by the three-dimensional model generation device corresponding to the sequence of imaging of the camera, according to Example 2.

FIG. 6B illustrates a sequence of frames determined by three-dimensional model generation device 100 corresponding to the sequence of imaging of camera 301, according to Example 2.

In Example 2, camera 301 images a subject while approaching the subject. In this case, frameset generator 141 generates a frameset in which frames are arranged in a direction opposite to the moving direction of camera 301 following the sequence of processing as illustrated in FIG. 6B. To be more specific, frameset generator 141 generates the frameset in which frames are arranged in a sequence opposite to a sequence in which the subject is imaged.

As described above, the plurality of frames are captured by camera 301 while the position of camera 301 approaches the subject. In this case, frameset generator 141 is capable of generating the frameset in which the frames captured by camera 301 are arranged in the order of a shorter distance between the position of camera 301 and the subject, by arranging the frames of the frameset in the sequence opposite to the sequence in which the subject is imaged.

In Examples 1 and 2 described above, the change in the position of camera 301 while capturing the frames is constant with respect to the subject, and time information indicating a time when a frame is captured is added to this frame. In this case, frameset generator 141 may generate a frameset in which the frames are rearranged in accordance with the time information.

Example 3

Figure 7A:
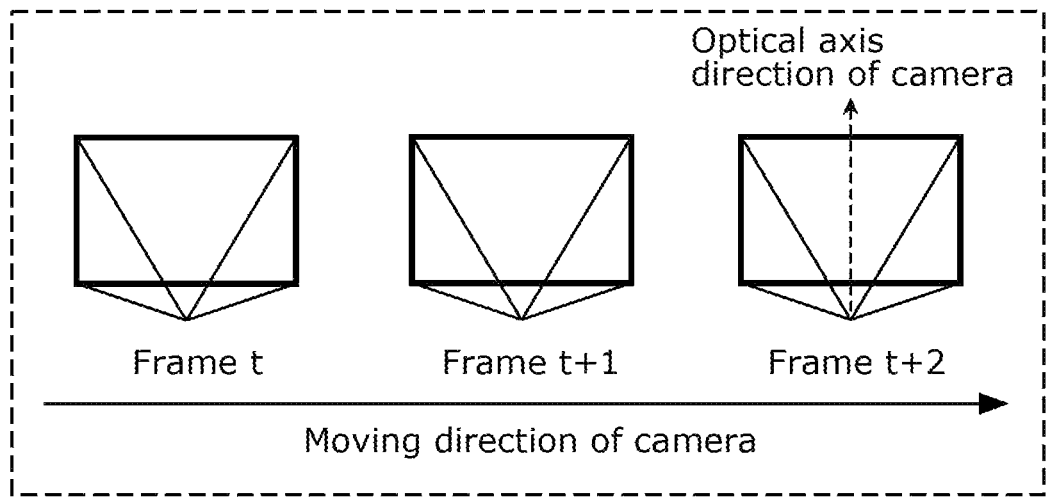
FIG. 7A illustrates a sequence of imaging of a camera according to Example 3.

FIG. 7A illustrates a sequence of imaging of camera 301 according to Example 3.

Figure 7B:
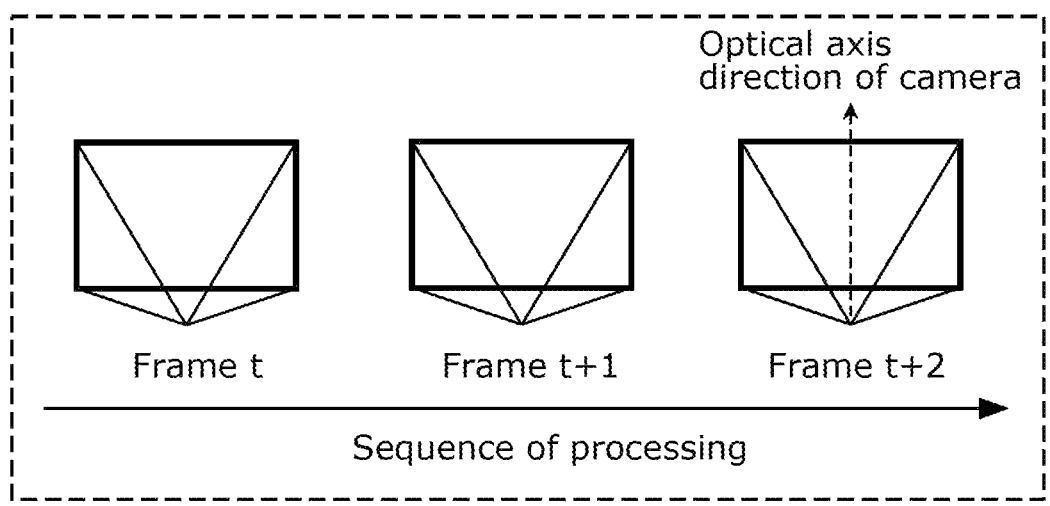
FIG. 7B illustrates a sequence of processing performed by the three-dimensional model generation device corresponding to the sequence of imaging of the camera, according to Example 3.

FIG. 7B illustrates a sequence of frames determined by three-dimensional model generation device 100 corresponding to the sequence of imaging of camera 301, according to Example 3.

In Example 3, camera 301 images a subject while moving without changing the distance from the subject. In this case, frameset generator 141 may generate a frameset in which frames are freely rearranged. FIG. 7B illustrates processing of generating a frameset in which frames are arranged in a moving direction of the camera, or more specifically, in a sequence in which the subject is imaged.

As described above, multi-view video is captured by camera 301 that moves parallel with the subject. More specifically, camera 301 captures the multi-view video without changing the distance from the subject. In this case, frameset generator 141 generates the frameset from the plurality of frames regardless of the sequence in which the subject is imaged.

Example 4

Figure 8A:
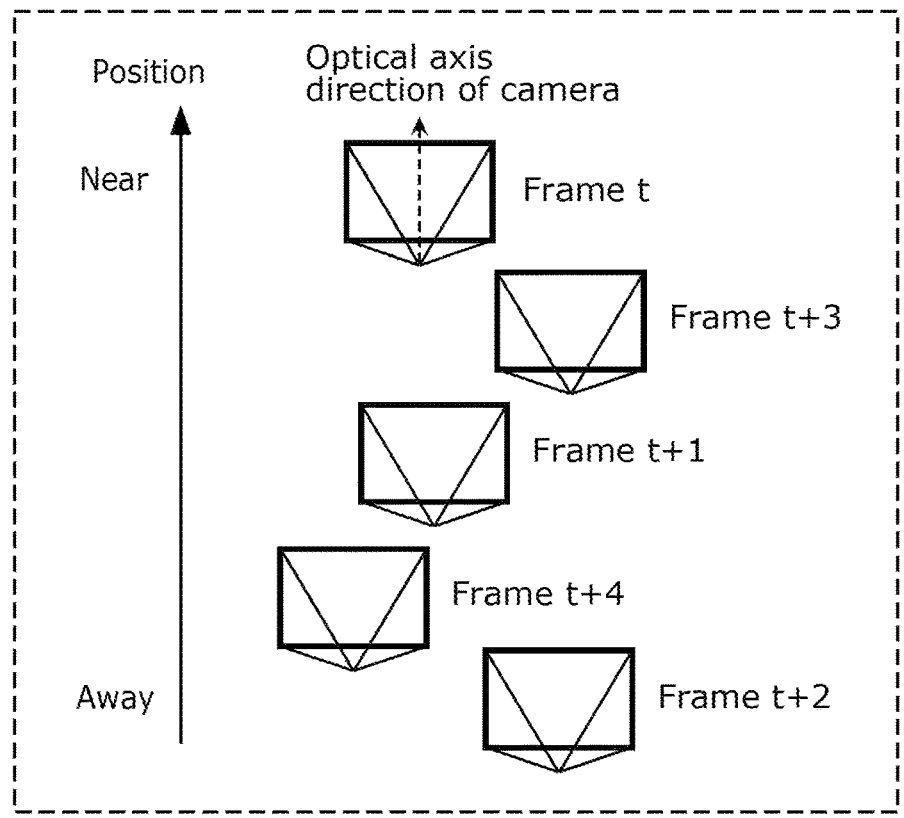
FIG. 8A illustrates a sequence of imaging of a camera according to Example 4.

FIG. 8A illustrates a sequence of imaging of camera 301 according to Example 4.

Figure 8B:
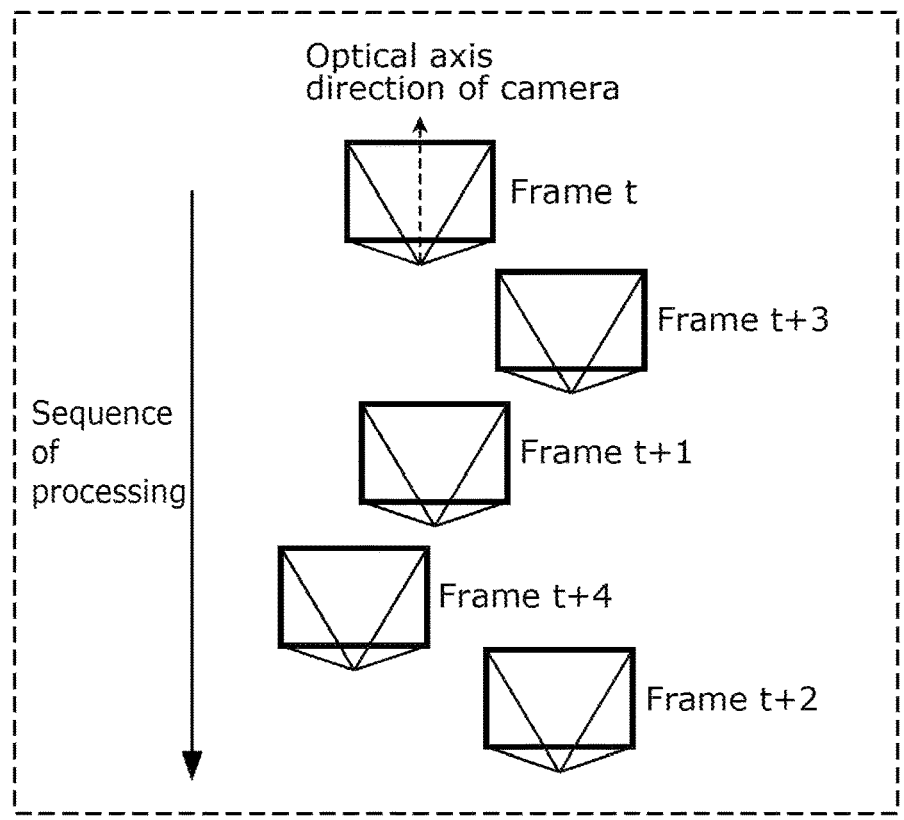
FIG. 8B illustrates a sequence of processing performed by the three-dimensional model generation device corresponding to the sequence of imaging of the camera, according to Example 4.

FIG. 8B illustrates a sequence of frames determined by three-dimensional model generation device 100 corresponding to the sequence of imaging of camera 301, according to Example 4.

In Example 4, camera 301 images a subject while randomly changing the distance from the subject. In this case, frameset generator 141 generates a frameset in which frames are arranged in the order of a shorter distance from the subject following the sequence of processing as illustrated in FIG. 8B. To be more specific, frameset generator 141 generates the frameset in which the frames are rearranged according to the positive direction of the optical axis direction of the camera. The example in FIG. 8B illustrates that frameset generator 141 generates the frameset in which frame t, frame t+3, frame t+1, frame t+4, and frame t+2 are arranged in this order.

Through this processing, frameset generator 141 is capable of generating the frameset in which the frames are rearranged in the order of a shorter distance between the position of camera 301 and the subject, regardless of the sequence in which the frames are captured.

[Processing of Specifying Frame]

Figure 9:
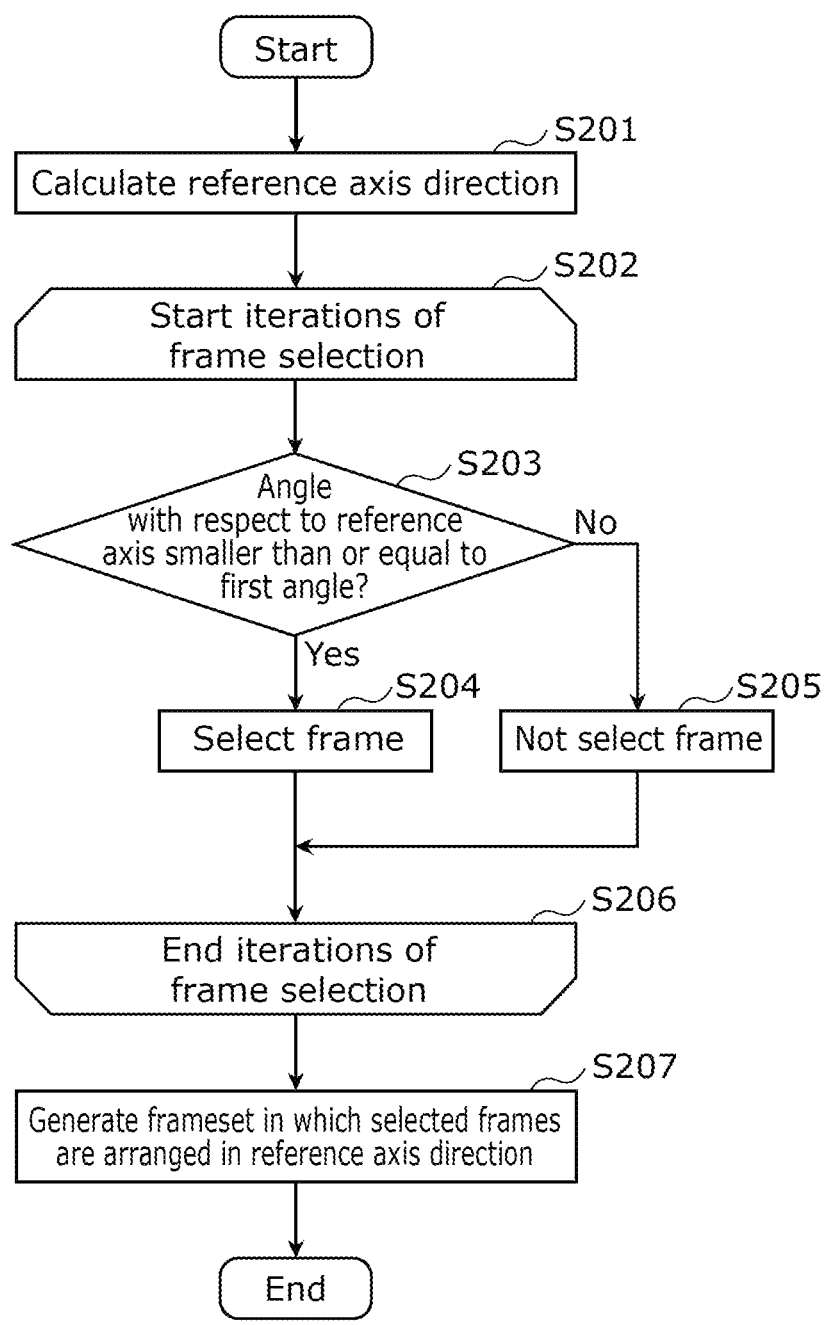
FIG. 9 is a flowchart illustrating details of processing performed by a frameset generator included in the three-dimensional model generation device according to Embodiment 1.

The following describes a procedure performed by frameset generator 141 to specify a frame, with reference to FIG. 9.

As described above, frameset generator 141 generates the frameset in which the plurality of frames are rearranged in the order of a shorter distance between the position of camera 301 and the subject, or more specifically, in the order of a shorter distance between the position of camera 301 when capturing the frame and the predetermined region.

Here, to generate the three-dimensional model, three-dimensional model generator 143 may not use all of the captured frames stored in storage 120 (or more specifically, all of the frames captured by camera 301). To be more specific, generator 140 (or more specifically, frameset generator 141) may thin out the plurality of frames (captured frames) to generate the frameset. In other words, frameset generator 141 may specify (or more specifically, select) some frames from among all the frames captured by camera 301.

FIG. 9 is a flowchart illustrating an example of frameset generation processing performed by three-dimensional model generation device 100 according to Embodiment 1.

Frameset generator 141 first calculates a reference axis direction (or more specifically, a positive direction of the reference axis) from the plurality of frames (Step S201).

In Step S201, frameset generator 141 calculates an optical axis direction of camera 301 for each frame in accordance with camera parameters and then calculates the reference axis direction in accordance with the calculated optical axis direction, for example. For instance, frameset generator 141 calculates a mean position of the positions of camera 301 that captures the frames. Moreover, frameset generator 141 calculates a mean value (a mean angle) of angles each between a predetermined axis freely determined beforehand and passing through the calculated mean position and the optical axis direction of camera 301 when capturing the frame, for example. For instance, frameset generator 141 calculates, as the reference axis direction, a direction of an axis that passes through the calculated mean position and is inclined at the calculated mean angle with respect to the predetermined axis.

Alternatively, frameset generator 141 calculates the optical axis direction of camera 301 for each of the captured frames, and then calculates the reference axis direction by applying a least-square method to a plurality of optical axis directions. In this case, frameset generator 141 may exclude an optical axis direction having an error greater than a predetermined threshold value.

Alternatively, in Step S201, frameset generator 141 specifies a representative frame from among the plurality of frames and then determines, as the reference axis direction, the optical axis direction of camera 301 that captures the specified representative frame, for example.

Any given method can be used to specify the representative frame. For example, frameset generator 141 specifies, as the representative frame, a frame captured by camera 301 that is nearest to the subject among cameras 301 that capture the plurality of frames. Alternatively, frameset generator 141 specifies, as the representative frame, a frame captured by camera 301 at a middle distance from the subject among cameras 301 that capture the plurality of frames.

Next, frameset generator 141 starts iteration of frame selection (Step S202). To be more specific, frameset generator 141 performs processes from Step S203 to Step S205 for each of the plurality of frames stored in storage 120.

Frameset generator 141 determines whether the angle between the reference axis (or more specifically, the positive direction of the reference axis) calculated in Step S201 and the optical axis direction of camera 301 that captures the frame is smaller than or equal to a first angle (Step S203).

If the angle between the reference axis calculated in Step S201 and the optical axis direction of camera 301 that captures the frame is not smaller than or equal to the first angle (No in Step S203), frameset generator 141 does not select this frame (Step S205). More specifically, if "No" in Step S203, frameset generator 141 does not select this frame and thus does not add this frame to the frameset to be generated. If frameset generator 141 does not select this frame, this means that frameset generator 141 does not use this frame in a process to be executed in Step S207 later and that this frame is not to be deleted from storage 120, for example.

In contrast, if the angle between the reference axis calculated in Step S201 and the optical axis direction of camera 301 that captures the frame is smaller than or equal to the first angle (Yes in Step S203), frameset generator 141 selects this frame (Step S204). If frameset generator 141 selects this frame, this means that frameset generator 141 uses this frame in the process to be executed in Step S207 later.

After the iteration from Step S203 to Step S205 for each of the plurality of frames, that is, after the iterations for selecting or not selecting the frame, frameset generator 141 ends the iteration (Step S206).

Next, frameset generator 141 generates the frameset in which the frames selected in Step S204 are rearranged in the order of a shorter distance between camera 301 and the subject along the reference axis calculated in Step S201, that is, in the order of a shorter distance between the position of camera 301 when capturing the frame and the predetermined region (Step S207). For example, frameset generator 141 puts serial numbers on the plurality of rearranged frames in order in Step S207.

Here, a threshold value for the first angle may be stored in storage 120 beforehand, for example. The first angle may be freely set and is not particularly intended to be limiting. For example, frameset generator 141 may select the representative frame in accordance with the position of camera 301, instead of the angle with respect to the reference axis.

Moreover, frameset generator 141 may store the generated frameset into storage 120. Alternatively, frameset generator 141 may output the frameset to three-dimensional model generator 143 that is to generate a new three-dimensional model based on the frameset later.

The determination in Step S203 is made in accordance with whether the angle is smaller than or equal to the first angle. However, the term "first angle" does not imply strictness. For example, the meaning of the phrase "the angle is smaller than or equal to the first angle" may also include that "the angle is smaller than the first angle".

[Processing of Generating Three-Dimensional Model]

The following describes three-dimensional model generation processing performed by three-dimensional model generation device 100, with reference to FIG. 10 to FIG. 13.

Figure 10:
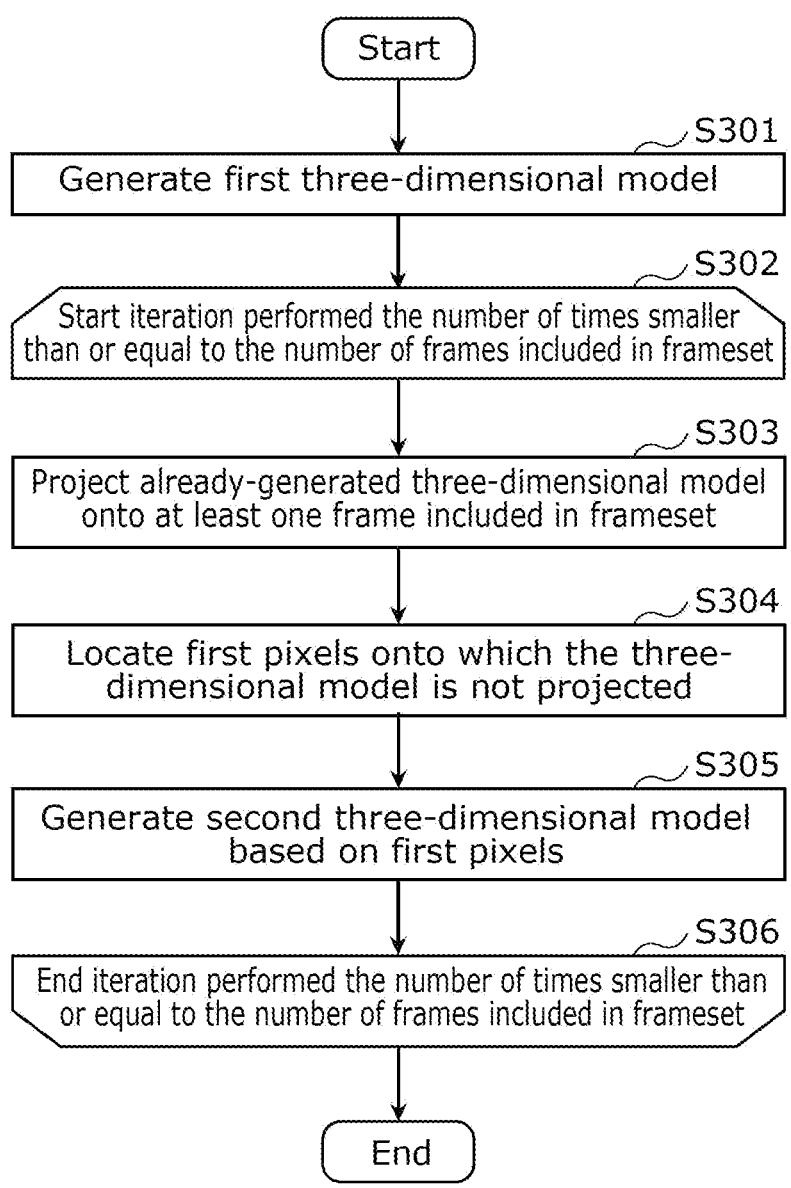
FIG. 10 is a flowchart illustrating details of processing performed by a generator included in the three-dimensional model generation device according to Embodiment 1.

FIG. 10 is a flowchart illustrating the three-dimensional model generation processing performed by three-dimensional model generation device 100, according to Embodiment 1.

First three-dimensional model generator 144 first generates a three-dimensional model (a first three-dimensional model) using a plurality of frames (first frames) included in the frameset (Step S301).

Next, generator 140 starts iteration performed the number of times smaller than or equal to the number of frames included in the frameset (Step S302). To be more specific, generator 140 performs processes from Step S302 to Step S306 for each frame included in the frameset other than the frames used in Step S301.

Next, locator 142 projects the three-dimensional model that is already generated (the already-generated three-dimensional model, that is, the third three-dimensional model) onto at least one frame (second frame) included in the frameset (Step S303). In Step S303, locator 142 projects the already-generated three-dimensional model onto the frames of the frameset in the sequence determined by frameset generator 141. At first, the already-generated three-dimensional model is only the first three-dimensional model generated in Step S301. By iterations of the processes from Step S303 to Step S305, a new three-dimensional model (a second three-dimensional model) generated in Step S305 described later is sequentially added as the already-generated three-dimensional model.

Next, locator 142 locates first pixels onto which the three-dimensional model (or more specifically, three-dimensional points included in the three-dimensional model) is not projected in the second frame onto which the three-dimensional model is projected (Step S304).

Next, second three-dimensional model generator 145 generates a new three-dimensional model (a second three-dimensional model) in accordance with the first pixels located in Step S304 (Step S305). More specifically, second three-dimensional model generator 145 generates the second three-dimensional model including points that are not included in the already-generated three-dimensional model.

Next, generator 140 ends this iteration performed the number of times smaller than or equal to the number of frames included in the frameset (Step S306). To be more specific, in Step S303 performed in second and subsequent iterations of this loop from Step S303 to Step S305, the second three-dimensional model generated in Step S305 in the previous iteration is added as the already-generated three-dimensional model.

Figure 11:
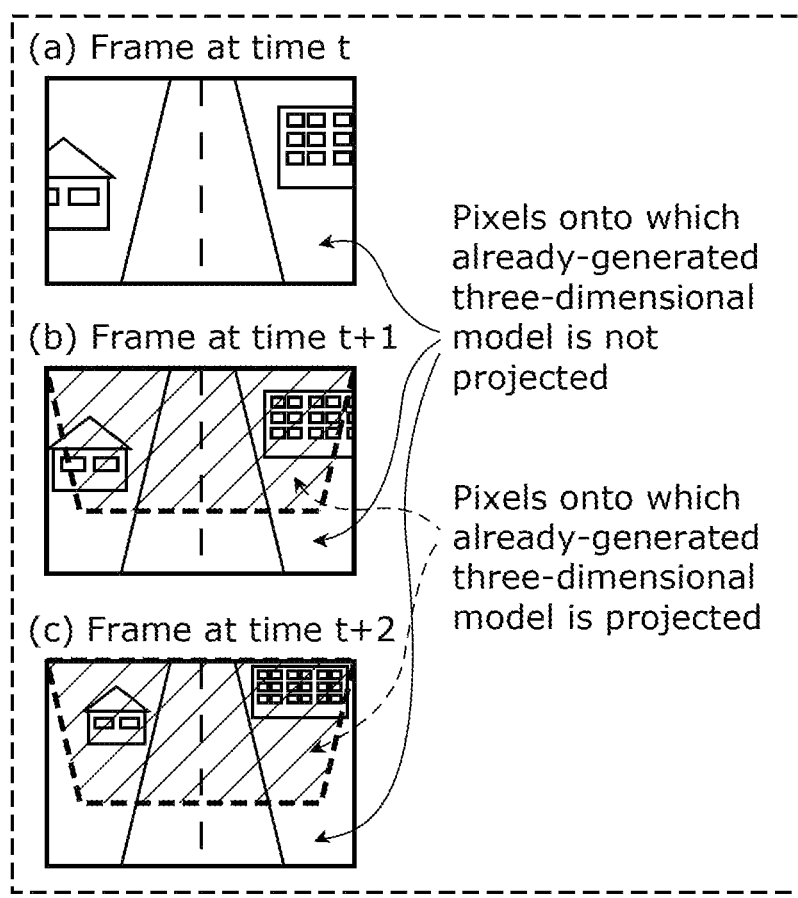
FIG. 11 illustrates an area in a frame to be processed in generation processing performed by a three-dimensional model generator included in the three-dimensional model generation device according to Embodiment 1.

FIG. 11 illustrates an area to be processed in the generation processing performed by generator 140 included in three-dimensional model generation device 100 according to Embodiment 1.

Figure 12:
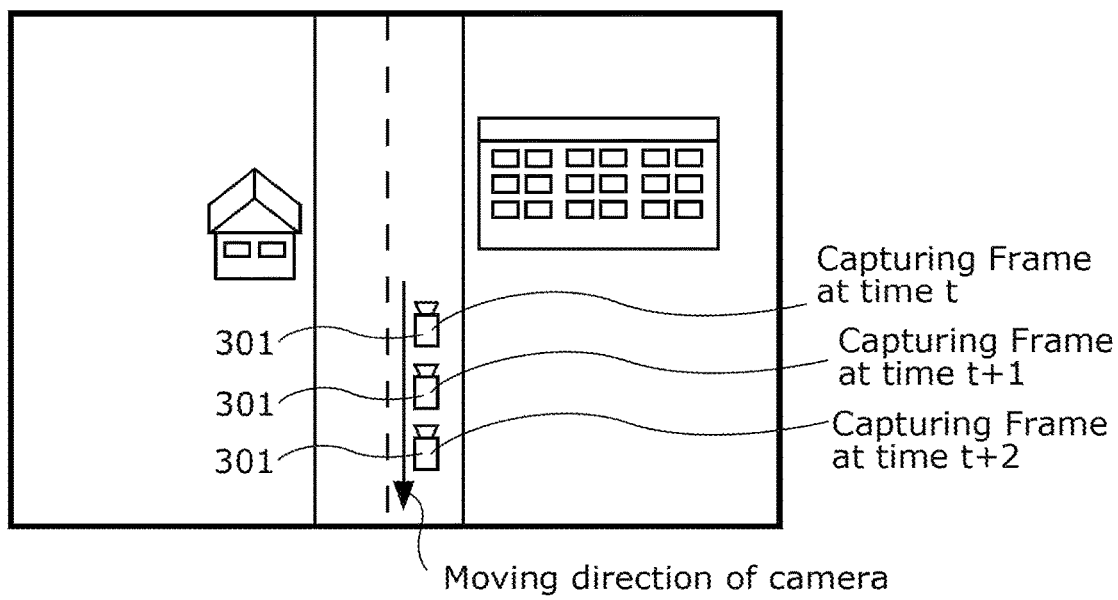
FIG. 12 illustrates change in a position of the camera.

FIG. 12 illustrates change in a position of camera 301.

Figure 13:
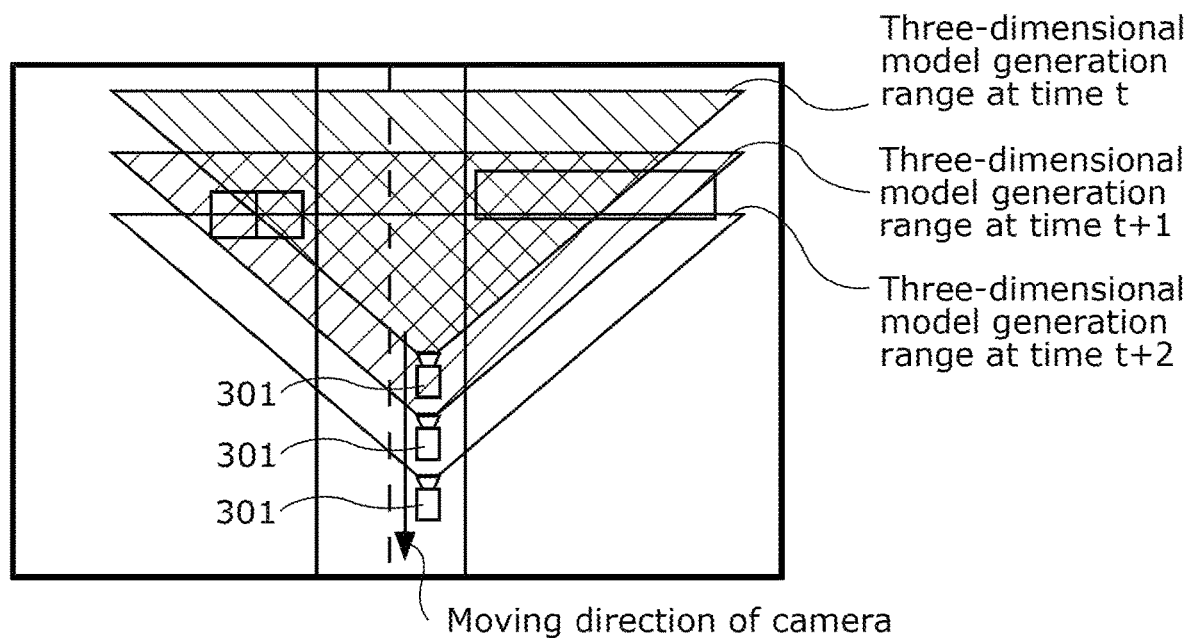
FIG. 13 illustrates change in imaging region of the camera.

FIG. 13 illustrates change in imaging region of camera 301.

Note that frames illustrated in (a) to (c) of FIG. 11 are captured by camera 301 as illustrated in FIG. 12 and FIG. 13. Note also that FIG. 12 and FIG. 13 illustrate the same scene. FIG. 12 is a perspective view whereas FIG. 13 is a top view. In FIG. 13, three-dimensional model generation ranges (that is, capture ranges) at times t and t+1 are indicated with hatch lines.

As illustrated in (a) of FIG. 11 for instance, the already-generated three-dimensional model is not projected onto any area of a frame at time t. In this case, second three-dimensional model generator 145 generates a second three-dimensional model corresponding to all pixels of the frame at time t.

As illustrated in (b) of FIG. 11 for instance, the already-generated three-dimensional model is projected onto a hatched part of a frame at time t+1. To be more specific, the hatched part in (b) of FIG. 11 corresponds to a pixel area onto which the second three-dimensional model generated from the frame at time t illustrated in (a) of FIG. 11 is projected. In this case, second three-dimensional model generator 145 generates a second three-dimensional model corresponding to pixels of an unhatched part in (b) of FIG. 11.

As illustrated in (c) of FIG. 11 for instance, the already-generated three-dimensional model is projected onto a hatched part of a frame at time t+2. To be more specific, the hatched part in (c) of FIG. 11 corresponds to a pixel area onto which the second three-dimensional model generated from the frame at time t illustrated in (a) of FIG. 11 and the second three-dimensional model generated from the frame at time t+1 illustrated in (b) of FIG. 11 are projected. In this case, second three-dimensional model generator 145 generates a second three-dimensional model corresponding to pixels of an unhatched part (that is, first pixels) in (c) of FIG. 11.

In this way, second three-dimensional model generator 145 generates the second three-dimensional models according to the sequence of the frames included in the frameset generated by frameset generator 141.

Figure 14:
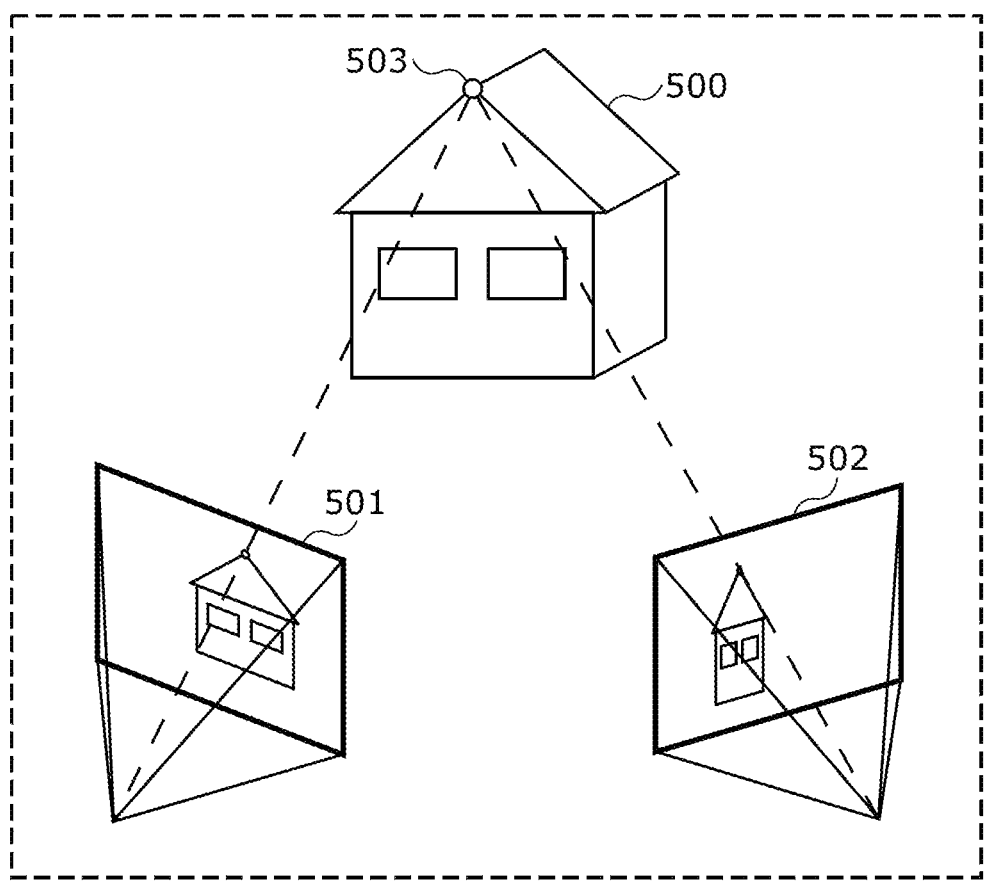
FIG. 14 illustrates a specific example of the generation processing performed by the three-dimensional model generator included in the three-dimensional model generation device according to Embodiment 1.

The following describes a three-dimensional model generation method, with reference to FIG. 14.

To generate a first three-dimensional model, three-dimensional model generator 143 generates already-generated three-dimensional points using two frames, for example.

FIG. 14 illustrates three-dimensional model generation processing performed by three-dimensional model generator 143.

As illustrated in FIG. 14, first three-dimensional model generator 144 generates a first three-dimensional model of subject 500 using two frames that are reference frame 501 and visible frame 502, for example.

Reference frame 501 and visible frame 502 are not particularly intended to be limiting. However, each of reference frame 501 and visible frame 502 may include subject 500 and an overlapping point (such as feature point 503 in FIG. 14) of subject 500.

First three-dimensional model generator 144 generates the first three-dimensional model by using a first frame of the frameset as reference frame 501 and a second frame of the frameset as visible frame 502, for instance. For example, first three-dimensional model generator 144 calculates normalized cross correlation (NCC), as N (I, J), between small areas in a pair of reference frame 501 and visible frame 502, according to Equation 1 below. Then, first three-dimensional model generator 144 generates matching information indicating a result of matching between the frames. Moreover, first three-dimensional model generator 144 generates the three-dimensional model by a triangulation method in accordance with information indicating the position and orientation of camera 301 for each of reference frame 501 and visible frame 502 and the matching information between the frames.

[Math. 1]

$$N(I, J) = \frac{\sum (I_{xy} - \overline{I_{xy}}) \cdot (J_{xy} - \overline{J_{xy}})}{\sqrt{(I_{xy} - \overline{I_{xy}})^2} \sqrt{(J - \overline{J_{xy}})^2}} \quad \text{Equation 1}$$

Note that $I_{xy}$ and $J_{xy}$ represent pixel values in the small areas of frame I and frame J, respectively. Moreover, the following are mean values of the pixel values in the small areas of frame I and frame J.

$\overline{I_{xy}}$ [Math. 2]

$\overline{J_{xy}}$ [Math. 3]

Second three-dimensional model generator 145 generates a second three-dimensional model by a procedure similar to the procedure performed by first three-dimensional model generator 144 to generate the first three-dimensional model. To be more specific, first three-dimensional model generator 144 generates the first three-dimensional model by using the first frame of the frameset as reference frame 501 and the second frame of the frameset as visible frame 502, for example. In this case, second three-dimensional model generator 145 uses a third frame of the frameset as a new visible frame and projects the first three-dimensional model onto this visible frame.

For example, second three-dimensional model generator 145 calculates NCC, as N (I, J), between small areas in a pair of reference frame 501 (such as the first frame of the frameset) and a pixel area on which the first three-dimensional model is not projected in the new visible frame, according to Equation 1 above. Then, second three-dimensional model generator 145 generates matching information indicating a result of matching between the frames. Moreover, three-dimensional model generator 143 generates the second three-dimensional model by the triangulation method in accordance with information indicating the position and orientation of camera 301 for each of reference frame 501 and the new visible frame and the matching information between the frames.

Advantageous Effects Etc.

As described thus far, the three-dimensional model generation method according to Embodiment 1 includes: generating a first three-dimensional model of a predetermined region from first frames (Step S105); projecting the first three-dimensional model onto at least one second frame (Step S106); and generating a second three-dimensional model in accordance with first pixels in the at least one second frame onto which the first three-dimensional model is not projected (Step S107).

This enables a three-dimensional model to be generated sequentially corresponding to a difference between the generated three-dimensional models. Thus, a model corresponding to an overlapping part common to the three-dimensional models is not generated. This reduces processing time for three-dimensional model generation. Moreover, the three-dimensional model generation method according to Embodiment 1 projects the first three-dimensional model onto the at least one second frame. Even if some of subjects are located outside the imaging region when the at least one second frame is captured, a three-dimensional model corresponding to these some of the subjects is not to be lost. For example, a subject that is difficult to be still may be captured once to generate the plurality of first frames. This allows the three-dimensional model of this subject to be generated and also allows the three-dimensional model of the other subjects to be generated in accordance with the at least one second frame.

For example, the three-dimensional model generation method according to Embodiment 1 further includes: generating, in accordance with a position and an orientation of a camera for each of a plurality of frames (multiple frames) captured by camera 301, a frameset that includes a plurality of frames among the multiple frames captured (Step S104). The plurality of frames in the frameset include the plurality of first frames and the at least one second frame.

This enables the three-dimensional model to be generated using the frameset including the frames selected from among the plurality of frames in accordance with the positions and orientations of camera 301. Thus, the frameset that does not include an unnecessary frame in which the predetermined region is not captured is generated, for example. More specifically, a three-dimensional model corresponding to an unnecessary frame is not generated. This reduces the processing time.

For example, the generating of the frameset includes arranging the plurality of frames in the frameset in a sequence of the plurality of frames. In the projecting, a third three-dimensional model that is an already-generated three-dimensional model including the first three-dimensional model is projected onto the at least one second frame. In the locating, a plurality of first pixels onto which the third three-dimensional model is not projected are located in the at least one second frame onto which the third three-dimensional model is projected. The projecting, the locating, and the generating of the second three-dimensional model are performed for each of the plurality of frames in the sequence.

This enables the projection and the generation of the second three-dimensional model to be executed for each of the frames. By projecting the already-generated three-dimensional model including the first three-dimensional model and the generated second three-dimensional model onto the frame, the first pixels on which the model is not projected can be extracted. This further reduces the processing time.

For example, in the generating of the frameset, the plurality of frames in the frameset are arranged in order of a shorter distance between the predetermined region and the position of camera 301 for each of the plurality of frames in the frameset captured by camera 301.

This enables the second three-dimensional model to be generated using the frames arranged in the order of a shorter distance between the predetermined region and camera 301 that captures the frames. The frame captured by camera 301 nearer to the subject is an image with higher precision, or more specifically, with higher quality. Hence, the above method reduces the processing time for three-dimensional model generation and also enhances the precision of the three-dimensional model.

For example, in the generating of the frameset, when a direction from camera 301 toward the predetermined region is defined as a positive direction of a reference axis, the plurality of frames in the frameset are arranged in the order of a shorter distance, along the positive direction of the reference axis, between the predetermined region and the position of camera 301 for each of the plurality of frames in the frameset captured by camera 301.

This enables the plurality of frames to be arranged in the order of a shorter distance between the predetermined region and camera 301, in accordance with the reference axis direction.

For example, the generating of the frameset includes calculating the positive direction of the reference axis in accordance with an optical axis direction of camera 301 at a time of capturing a corresponding one of the plurality of frames in the frameset captured by camera 301.

In this case, the optical axis direction of camera 301 is the reference axis direction, for example. Thus, an unnecessary frame that hardly includes the predetermined region can be easily excluded from the frameset. This reduces processing time for the unnecessary frame when the three-dimensional model is to be generated.

For example, the generating of the frameset includes: selecting a representative frame from among the plurality of frames; and calculating, as the positive direction of the reference axis, an optical axis direction of camera 301 at a time of capturing the representative frame.

This enables the reference axis direction to be calculated from the optical axis direction of camera 301 that captures the representative frame, unlike the case where the reference axis direction is calculated from the optical axis directions of camera 301 that captures the plurality of frames. Selecting only an appropriate number of representative frames can reduce processing time for calculation of the reference axis direction.

For example, the generating of the frameset includes: determining whether each of the plurality of frames satisfies a first condition; and generating the frameset from a plurality of frames that satisfy the first condition among the plurality of frames.

The predetermined first condition that is set appropriately can exclude, from the frameset, an unnecessary frame onto which the first three-dimensional model is entirely projected or which hardly includes the predetermined region. Thus, the above method reduces the processing time for the unnecessary frame when the three-dimensional model is to be generated.

For example, in the generating of the frameset, the determining is performed in accordance with the first condition that an angle between the positive direction of the reference axis and the optical axis direction of camera 301 at a time of capturing the frame is smaller than or equal to a first angle.

Thus, an unnecessary frame that hardly includes the predetermined region can be easily excluded from the frameset. This reduces the processing time for the unnecessary frame when the three-dimensional model is to be generated.

For example, the predetermined region includes at least one of a stationary subject or a moving subject.

In this case, if the predetermined region includes the subject, a distance between the predetermined region and camera 301 can be calculated as a distance with respect to the subject. This allows the distance to be calculated accurately.

For example, the at least one second frame is identical to at least one of the plurality of first frames.

In this case, if the second frame is determined from among the plurality of frames for example, the first frames are not to be excluded. This reduces the processing time.

For example, each of the plurality of first frames is different from the at least one second frame.

In this case, when the second three-dimensional model is generated, the second three-dimensional model is not projected onto the first frame. This reduces processing time for generating the second three-dimensional model.

Three-dimensional model generation device 100 according to Embodiment 1 includes: first three-dimensional model generator 144 that generates a first three-dimensional model of a predetermined region from a plurality of first frames; locator 142 that projects the first three-dimensional model onto at least one second frame, and locates a plurality of first pixels onto which the first three-dimensional model is not projected; and second three-dimensional model generator 145 that generates a second three-dimensional model in accordance with the plurality of first pixels.

Three-dimensional model generation device 100 enables a three-dimensional model to be generated sequentially corresponding to a difference between the generated three-dimensional models. Thus, a model corresponding to an overlapping part common to the three-dimensional models is not generated. Hence, three-dimensional model generation device 100 reduces processing time for three-dimensional model generation.

Embodiment 2

The following describes a three-dimensional model generation device according to Embodiment 2. In Embodiment 2, components that are substantially identical to those according to Embodiment 1 are assigned the same reference signs used in Embodiment 1. Thus, description on these identical components may be partly simplified or omitted here.

[Configuration]

Figure 15:
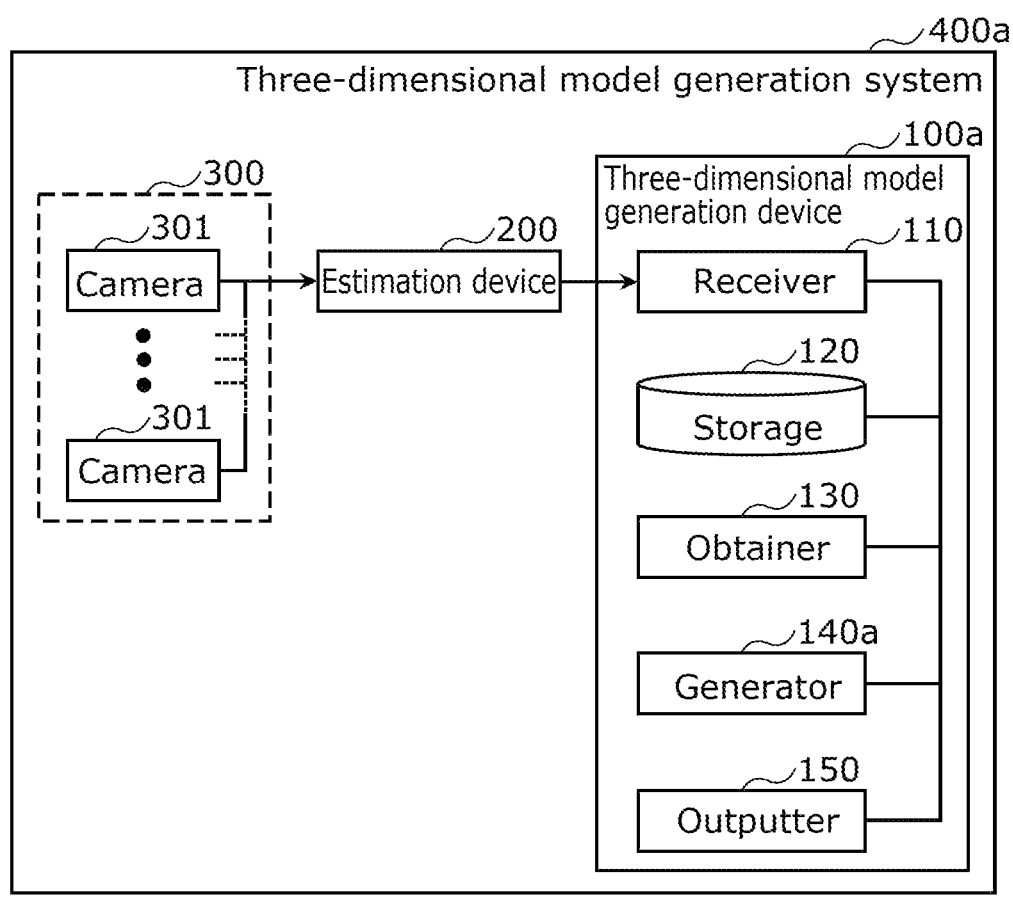
FIG. 15 is a block diagram illustrating a characteristic configuration of a three-dimensional model generation device according to Embodiment 2.

A configuration of the three-dimensional model generation device according to Embodiment 2 is first described, with reference to FIG. 15.

Figure 16:
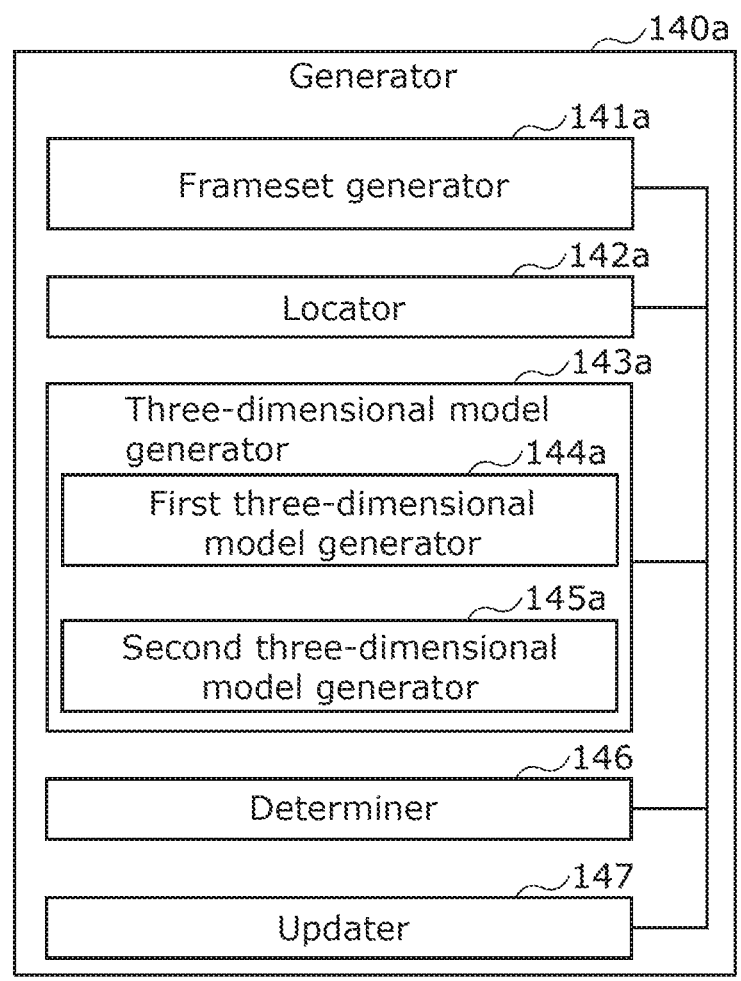
FIG. 16 is a block diagram illustrating a detailed configuration of a generator included in the three-dimensional model generation device according to Embodiment 2.

FIG. 15 is a block diagram illustrating a characteristic configuration of three-dimensional model generation device 100a according to Embodiment 2. FIG. 16 is a block diagram illustrating a characteristic configuration of generator 140a included in three-dimensional model generation device 100a according to Embodiment 2.

Three-dimensional model generation system 400a according to Embodiment 2 includes camera group 300, estimation device 200, and three-dimensional model generation device 100a.

Three-dimensional model generation device 100a includes receiver 110, storage 120, obtainer 130, generator 140a, and outputter 150.

Generator 140a includes frameset generator 141a, locator 142a, three-dimensional model generator 143a, determiner 146, and updater 147.

Frameset generator 141a is a processor that determines a sequence of a plurality of frames to generate a frameset. Here, frameset generator 141a maintains a sequence of the frames as stored in storage 120. To be more specific, frameset generator 141a generates the frameset in which the frames are arranged according to a sequence of imaging of camera 301.

Locator 142a is a processor that projects the already-generated three-dimensional model on an image in the sequence of the frames in the frameset generated by frameset generator 141a. Locator 142a projects a first three-dimensional model onto at least one second frame and then locates, in the at least one second frame, a plurality of second pixels (projection pixels) onto which the first three-dimensional model is projected. To be more specific, locator 142a projects the first three-dimensional model onto the at least one second frame that is different from first frames but included in the plurality of frames (or more specifically, the frameset). Then, locator 142a locates: second pixels in the at least one second frame onto which the first three-dimensional model is projected; and pixels of the first three-dimensional model that is projected onto the at least one second frame. In other words, locator 142a locates, in the frame onto which the first three-dimensional model is projected, the second pixels onto which this first three-dimensional model is projected. Moreover, locator 142a locates the pixels (that is, three-dimensional points) of the first three-dimensional model that are projected onto the frame.

Furthermore, locator 142a locates, in the at least one second frame, a plurality of first pixels onto which the first three-dimensional model is not projected.

Three-dimensional model generator 143a is a processor that generates a three-dimensional model from a plurality of frames. Three-dimensional model generator 143a includes first three-dimensional model generator 144a and second three-dimensional model generator 145a.

First three-dimensional model generator 144a is a processor that generates a first three-dimensional model of a predetermined region, from a plurality of first frames. To be more specific, first three-dimensional model generator 144a generates the first three-dimensional model of a subject from at least two first frames included in the plurality of frames.

Second three-dimensional model generator 145a is a processor that generates a second three-dimensional model in accordance with the plurality of first pixels located by locator 142a.

Determiner 146 is a processor that determines whether at least one second position from which the at least one second frame is captured is nearer to the predetermined region than any one of a plurality of first positions from which the plurality of first frames are captured. To be more specific, determiner 146 determines whether a position of camera 301 that captures the at least one second frame including the second pixels located by locator 142a is nearer to the subject than a position of camera 301 that captures a frame used for generating pixels that are located by locator 142a and included in the first three-dimensional model. Thus, regarding the pixels in the frames onto which the already-generated three-dimensional model is projected by locator 142a, determiner 146 determines which is nearer to the subject: camera 301 that captures the frame that includes the pixels of the already-generated three-dimensional model corresponding to the second pixels; or camera 301 that captures the frame onto which the already-generated three-dimensional model is projected.

Determiner 146 determines that the at least one second position is nearer to the predetermined region than any one of the plurality of first positions, for example. In this case, updater 147 updates the first three-dimensional model in accordance with the plurality of second pixels located by locator 142a. To be more specific, updater 147 updates the first three-dimensional model so that overlapping pixels that share the same three-dimensional point of the three-dimensional model between the plurality of frames adopt the pixel of the frame captured by camera 310 that is nearest to the subject (that is, a pixel value before the three-dimensional model is projected).

For example, determiner 146 determines that the position of camera 301 that captures the at least one second frame is nearer to the subject than the position of camera 301 that captures the frame used for generating the pixels of the three-dimensional model. In this case, updater 147 generates a new three-dimensional model by updating (in other words, changing) the pixels of the three-dimensional model located by locator 142a to the second pixels of the at least one second frame located by locator 142a. To be more specific, updater 147 generates the new three-dimensional model from the pixels of the frame captured by camera 301 nearer to the subject, out of camera 301 that captures the frame used for generating the pixels of the already-generated three-dimensional model and camera 301 that captures the frame including the pixels onto which the already-generated three-dimensional model is projected.

For example, locator 142a projects the already-generated three-dimensional model onto a frame of the frameset onto which no three-dimensional model has been projected. Then, locator 142a locates, in this frame, second pixels onto which the three-dimensional model is projected. Here, if second three-dimensional model generator 145a does not generate a second three-dimensional model, the already-generated three-dimensional model is the first three-dimensional model. If second three-dimensional model generator 145a generates a second three-dimensional model, the already-generated three-dimensional model is the second three-dimensional model generated by second three-dimensional model generator 145a.

Locator 142a and three-dimensional model generator 143a project the three-dimensional model for each of the frames in the sequence of the frames in the frameset. This enables extraction of the second pixels onto which the already-generated three-dimensional model is projected in the frame and the corresponding pixels of the already-generated three-dimensional model. Then, locator 142a and three-dimensional model generator 143a generate the new three-dimensional model in accordance with the extracted pixels of the frame captured by camera 301 that is nearer to the subject, out of camera 301 that captures the frame used for generating the pixels of the already-generated three-dimensional model and camera 301 that captures the frame including the second pixels onto which the already-generated three-dimensional model is projected.

[Procedure]

Figure 17:
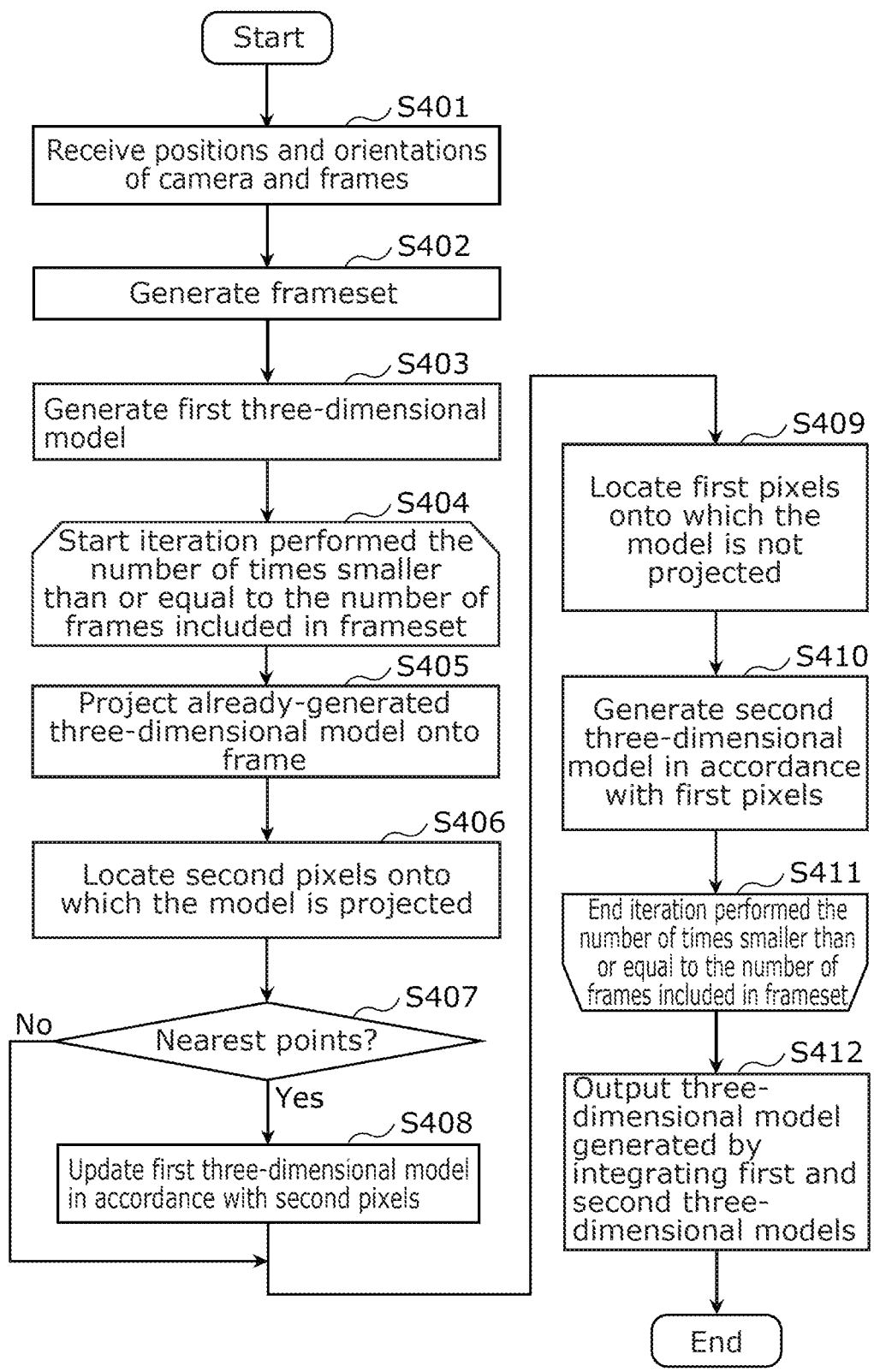
FIG. 17 is a flowchart illustrating details of processing performed by a three-dimensional model generator according to Embodiment 2.
Figure 18:
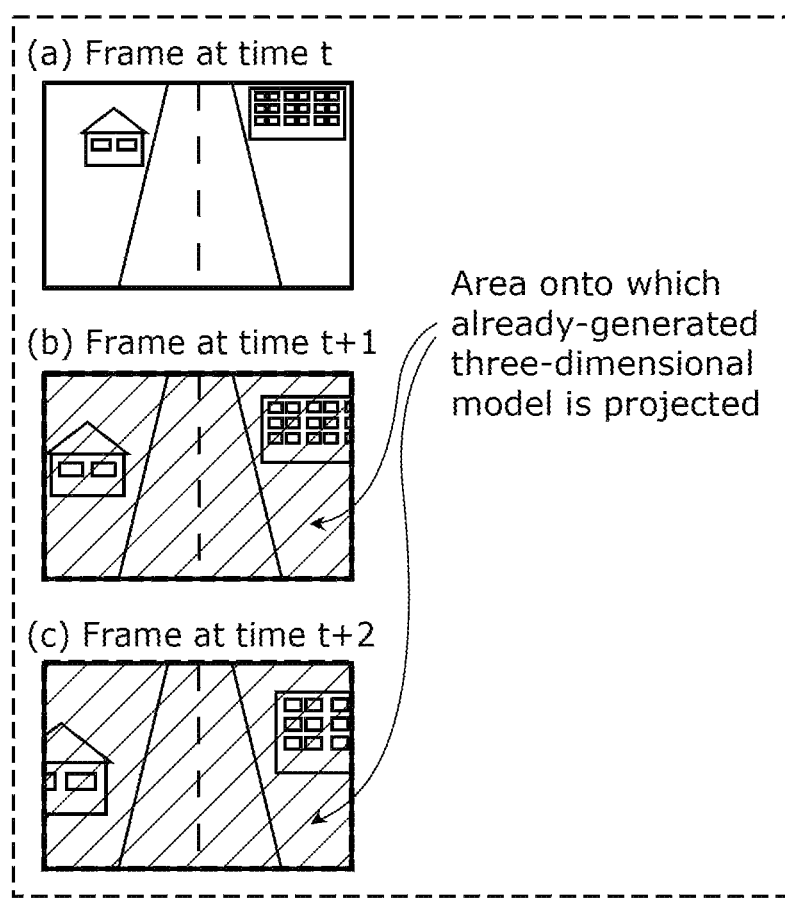
FIG. 18 illustrates an area in a frame to be processed in processing performed by an updater included in the three-dimensional model generation device according to Embodiment 2.

The following describes in detail a procedure performed by the three-dimensional model generation device according to Embodiment 2, with reference to FIG. 17 and FIG. 18.

FIG. 17 is a flowchart illustrating three-dimensional model generation processing performed by three-dimensional model generation device 100a according to Embodiment 2.

Obtainer 130 first obtains, from storage 120, information indicating positions and orientations of camera 301, camera parameters, and a plurality of frames, and then inputs these obtained pieces of data to generator 140a (Step S401). More specifically, as in Embodiment 1, receiver 110 receives information indicating positions and orientations of camera 301 estimated by estimation device 200, camera parameters, and a plurality of frames, and then outputs these received pieces of data to storage 120. Storage 120 stores the information indicating the positions and orientations of cameras 301, the camera parameters, and the plurality of frames that are received by receiver 110. Then, obtainer 130 executes Step S401.

Next, frameset generator 141a generates a frameset in which frames are arranged in a sequence in which camera 301 captures the frames (Step S402). For example, camera 301 transmits a captured frame in association with time information indicating a time when this frame is captured, to three-dimensional model generator 100a via estimation device 200. In accordance with the time information associated for each of the frames, frameset generator 141a generates the frameset in which the frames are arranged in the sequence in which camera 301 captures the frames.

Next, first three-dimensional model generator 144a generates a three-dimensional model (a first three-dimensional model) from the frameset (Step S403). For example, first three-dimensional model generator 144a generates the first three-dimensional model using any two frames (first frames) included in the frameset.

Next, generator 140a starts iteration performed the number of times smaller than or equal to the number of frames included in the frameset (Step S404). To be more specific, generator 140a performs processes from Step S405 to Step S408 for each of the plurality of frames included in the frameset.

Next, locator 142a projects the already-generated three-dimensional model onto at least one frame (second frame) included in the frameset (Step S405).

Next, locator 142a extracts pixels onto which three-dimensional points of the already-generated three-dimensional model are projected, from the frame onto which the already-generated three-dimensional model is projected (Step S406). To be more specific, in Step S406, locator 142a projects the already-generated three-dimensional model onto the at least one second frame that is different from the first frames but included in the plurality of frames, and then locates, in the at least one second frame, second pixels onto which the already-generated three-dimensional model is projected.

Next, determiner 146 determines whether the second pixels located by locator 142a in Step S406 are nearest points (Step S407). To be more specific, determiner 146 determines whether the at least one second position from which the at least one second frame is captured is nearer to the predetermined region than any one of the plurality of first positions from which the plurality of first frames are captured. To be more specific, determiner 146 determines whether the position of camera 301 that captures the at least one second frame including the extracted pixels located by locator 142a in Step S406 is nearer to the subject than the position of camera 301 that captures the frame used for generating the pixels of the already-generated three-dimensional model that are also located by locator 142a in Step S406. Determiner 146 determines, as the nearest points, the pixels included in the frame captured by camera 301 that is nearer to the subject.

Determiner 146 may determine that the second pixels of the second frame located in Step S407 are the nearest points (Yes in Step S407), or more specifically, that the at least one second position is nearer to the predetermined region than any one of the plurality of first positions. In this case, updater 147 updates the already-generated three-dimensional model in accordance with the second pixels in the second frame on which the first three-dimensional model has not yet been projected (Step S408). To be more specific, updater 147 updates the pixels of the already-generated three-dimensional model located in Step S406 to the second pixels of the second frame located in Step S406.

In contrast, determiner 146 may determine that the second pixels of the second frame located in Step S407 are not the nearest points (No in Step S407). In this case, updater 147 does not change the pixels of the already-generated three-dimensional model to the second pixels of this second frame. In other words, updater 147 does not update the pixels of the already-generated three-dimensional model.

Next, locator 142a locates first pixels onto which the three-dimensional model (or more specifically, three-dimensional points included in the three-dimensional model) is not projected, in the second frame onto which the three-dimensional model is projected (Step S409).

Next, second three-dimensional model generator 145a generates a new three-dimensional model (a second three-dimensional model) in accordance with the first pixels located in Step S409 (Step S410). More specifically, second three-dimensional model generator 145a generates the second three-dimensional model including points that are not included in the already-generated three-dimensional model.

Next, generator 140a ends the iteration performed for the frameset (Step S411).

Next, outputter 150 integrates the first three-dimensional model and the second three-dimensional model and outputs the integrated three-dimensional model (Step S412).

For the determination made by determiner 146 in Step S407, the frame used for generating the already-generated three-dimensional model may hold information indicating a distance between camera 301 and a three-dimensional point. Alternatively, each three-dimensional point (each pixel) of the already-generated three-dimensional model may hold an ID of camera 301 that captures the frame including the pixel, or more specifically, may hold information indicating a distance between camera 301 that captures the frame and the subject.

FIG. 18 illustrates an area in a frame to be processed by updater 147 included in three-dimensional model generation device 100a according to Embodiment 2. In FIG. 18, ranges in which pixels at time t+1 and time t+2 are replaced, that is, pixel areas on which the already-generated three-dimensional model is projected in the frames, are indicated with hatch lines.

As illustrated in an example of FIG. 18, a frame at time t+2, a frame at time t+1, and a frame at time t in this order are arranged in the order of a shorter distance from the subject.

As illustrated in (a) of FIG. 18 for instance, the already-generated three-dimensional model is not projected onto any area of the frame at time t. In this case, second three-dimensional model generator 145a generates a second three-dimensional model corresponding to all pixels of the frame at time t.

As illustrated in (b) of FIG. 18 for instance, the already-generated three-dimensional model is projected onto a hatched part of the frame at time t+1 (onto a whole of the frame at time t+1 in the present example). To be more specific, the hatched part in (b) of FIG. 18 corresponds to a pixel area onto which the already-generated three-dimensional model including the second three-dimensional model generated from the frame at time t illustrated in (a) of FIG. 18 is projected. In this case, updater 147 replaces, or more specifically, updates, three-dimensional points (pixels) of the already-generated three-dimensional model generated (updated) using the frame at time t onto which the already-generated three-dimensional model is projected, by the pixels of the frame at time t+1.

As illustrated in (c) of FIG. 18 for instance, the already-generated three-dimensional model is projected onto a hatched part of the frame at time t+2 (onto a whole of the frame at time t+2 in the present example). To be more specific, the hatched part in (c) of FIG. 18 corresponds to a pixel area (the whole of the frame at time t+2 in the present example) onto which the already-generated three-dimensional model updated from the frame at time t+1 illustrated in (b) of FIG. 18 is projected. In this case, updater 147 replaces three-dimensional points (pixels) of the already-generated three-dimensional model by the pixels of the frame at time t+2.

As described above, updater 147 updates as appropriate the pixels of the already-generated three-dimensional model in accordance with the position of camera 301 that captures the frame, for example. For instance, camera 301 may image a scene (subject) while moving in the camera optical axis direction (in other words, in the positive direction of the reference axis). In this case, updater 147 replaces all the projected pixels of the already-generated three-dimensional model by the pixels of the new three-dimensional model generated using the currently-processed frame.

Advantageous Effects Etc.

A three-dimensional model generation method according to Embodiment 2 includes: generating a first three-dimensional model of a predetermined region from a plurality of first frames (Step S403); projecting the first three-dimensional model onto at least one second frame (Step S404) and locating, in the at least one second frame, a plurality of second pixels onto which the first three-dimensional model is projected (Step S406); determining whether at least one second position from which the at least one second frame is captured is nearer to the predetermined region than any one of a plurality of first positions from which the plurality of first frames are captured (Step S407); and when the at least one second position is determined to be nearer to the predetermined region than any one of the plurality of first positions (Yes in Step S407), updating the first three-dimensional model in accordance with the plurality of second pixels in the second frame on which the first three-dimensional model has not yet been projected (Step S408).

This enables the three-dimensional model to be generated using the frames captured by camera 301 that are arranged in time sequence. Thus, the frames are processed in a sequence in which the frames are captured, without generating the frameset in which the frames are rearranged. This allows the three-dimensional model to be generated in a short time. Moreover, the pixels in a frame onto which the already-generated three-dimensional model is projected are updated to pixels with higher precision as compared to these pixels in this frame (or more specifically, updated to pixels of a frame that is captured by camera 301 nearer to the predetermined region). With these updated pixels, the new three-dimensional model is generated. Hence, the three-dimensional model with high precision can be generated.

For example, the projecting and locating includes locating, in the at least one second frame, a plurality of first pixels onto which the first three-dimensional model is not projected (Step S409). For example, the three-dimensional model generation method according to Embodiment 2 further includes generating a second three-dimensional model in accordance with the plurality of first pixels (Step S410).

This enables the second three-dimensional model to be generated using the first pixels that are not included in the first three-dimensional model.

OTHER EMBODIMENTS

Although the three-dimensional model generation method and the like according to the present disclosure have been described based on Embodiment 1 and Embodiment 2, the present disclosure is not limited to these embodiments.

For example, in the above embodiments, the processing units, such as generator 140, included in the three-dimensional model generation device or the like have been described as being realized by a CPU and a control program. For example, each of the constituent elements in such a processing unit may be implemented to one or more electric circuits. Each of the one or more electric circuits may be a general-purpose circuit or a specialized circuit. The one or more electric circuits may include, for example, a semiconductor device, an Integrated Circuit (IC), a Large Scale Integration (LSI), or the like. The IC or the LSI may be integrated into a single chip, or a plurality of chips. Note that here, the terminology "IC" or "LSI" is used, but depending on the degree of integration, the circuit may also referred to as system LSI, a Very Large Scale Integration (VLSI), or an Ultra Large Scale Integration (ULSI). Moreover, a Field Programmable Gate Array (FPGA) that is programmed after manufacturing an LSI may be used for the same purpose.

The general and specific aspects of the present disclosure may be implemented to a system, a device, a method, an integrated circuit, or a computer program. The aspects may be implemented to a non-transitory computer-readable recording medium, such as an optical disc, a Hard Disk Drive (HDD), or a semiconductor memory, on which the computer program is recorded. The aspects may be implemented to any combination of the system, the device, the method, the integrated circuit, the computer program, and the recording medium.

Those skilled in the art will readily appreciate that embodiments arrived at by making various modifications to the above embodiments arrived at by selectively combining elements disclosed in the above embodiment without materially departing from the scope of the present disclosure may be included within one or more aspects of the present disclosure.

The invention claimed is:

1. A three-dimensional model generation method comprising:
   generating a first three-dimensional model of a predetermined region from first frames from among a plurality of frames;
   projecting the first three-dimensional model onto projection pixels in at least one second frame from among the plurality of frames, the at least one second frame being different from the first frames;
   locating, in the at least one second frame, first pixels onto which the first three-dimensional model is not projected; and
   generating a second three-dimensional model in accordance with only the first pixels.

2. The three-dimensional model generation method according to claim 1, further comprising
   generating, in accordance with a position and an orientation of a camera for each of multiple frames captured by the camera, a frameset that includes frames among the multiple frames captured,
   wherein the frames in the frameset include the first frames and the at least one second frame.

3. The three-dimensional model generation method according to claim 2,
   wherein the generating of the frameset includes arranging the frames in the frameset in a sequence of the frames, in the projecting, a third three-dimensional model that is an already-generated three-dimensional model including the first three-dimensional model is projected onto the at least one second frame,
   in the generating of the second three-dimensional model, the first pixels are in the at least one second frame onto which the third three-dimensional model is not projected, and
   the projecting and the generating of the second three-dimensional model are performed for each of the frames in the sequence.

4. The three-dimensional model generation method according to claim 3,
   wherein in the generating of the frameset, the frames in the frameset are arranged in order of a shorter distance between the predetermined region and the position of the camera for each of the frames in the frameset.

5. The three-dimensional model generation method according to claim 4,
   wherein in the generating of the frameset, when a direction from the camera toward the predetermined region is defined as a positive direction of a reference axis, the frames in the frameset are arranged in the order of a shorter distance between the predetermined region and the position of the camera for each of the frames in the frameset, the shorter distance being along the positive direction of the reference axis.

6. The three-dimensional model generation method according to claim 5,
   wherein the generating of the frameset includes calculating the positive direction of the reference axis in accordance with an optical axis direction of the camera at a time of capturing a corresponding one of the frames in the frameset.

7. The three-dimensional model generation method according to claim 5,
   wherein the generating of the frameset includes:
   selecting a representative frame from among the frames; and
   calculating, as the positive direction of the reference axis, an optical axis direction of the camera at a time of capturing the representative frame.

8. The three-dimensional model generation method according to claim 5,
   wherein the generating of the frameset includes:
   determining whether each of the frames satisfies a first condition; and
   generating the frameset from a plurality of frames that satisfy the first condition among the frames.

9. The three-dimensional model generation method according to claim 8,
   wherein in the generating of the frameset, the determining is performed in accordance with the first condition that an angle between the positive direction of the reference axis and the optical axis direction of the camera at a time of capturing the frame is smaller than or equal to a first angle.

10. The three-dimensional model generation method according to claim 1,
    wherein the predetermined region includes at least one of a stationary subject or a moving subject.

11. A three-dimensional model generation device comprising:
    memory; and
    a processor coupled to the memory and configured to:
    generate a first three-dimensional model of a predetermined region from first frames from among a plurality of frames;

project the first three-dimensional model onto projection pixels at least one second frame from among the plurality of frames, the at least one second frame being different from the first frames;

locate, in the at least one second frame, first pixels onto which the first three-dimensional model is not projected; and generate a second three-dimensional model in accordance with only the first pixels.

12. A three-dimensional model generation method comprising:

generating a first three-dimensional model of a predetermined region from first frames from among a plurality of frames;

projecting the first three-dimensional model onto projection pixels in at least one second frame from among the plurality of frames, the at least one second frame being different from the first frames;

locating, in the at least one second frame, first pixels onto which the first three-dimensional model is not projected;

determining whether at least one second position from which the at least one second frame is captured is nearer to the predetermined region than any one of first positions from which the respective first frames are captured; and when the at least one second position is determined to be nearer to the predetermined region than any one of the first positions, updating the first three-dimensional model in accordance with the projection pixels before the updated first three-dimensional model is projected; and generating a second three-dimensional model in accordance with only the first pixels in the at least one second frame onto which the first three-dimensional model is not projected. outputting the first three dimensional model and the second three dimensional model.

* * * * *